(12) United States Patent
Itou

(10) Patent No.: US 12,436,421 B2
(45) Date of Patent: Oct. 7, 2025

(54) DISPLAY DEVICE

(71) Applicant: Shanghai Tianma Micro-Electronics Co., Ltd., Shanghai (CN)

(72) Inventor: Noriyuki Itou, Kanagawa (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/530,678

(22) Filed: Dec. 6, 2023

(65) Prior Publication Data
US 2024/0210746 A1 Jun. 27, 2024

(30) Foreign Application Priority Data
Dec. 27, 2022 (JP) ................. 2022-209740

(51) Int. Cl.
*G02F 1/1333* (2006.01)
(52) U.S. Cl.
CPC .... *G02F 1/13336* (2013.01); *G02F 1/133308* (2013.01)
(58) Field of Classification Search
CPC ............. G02F 1/13336; G02F 1/133308
See application file for complete search history.

(56) References Cited

U.S. PATENT DOCUMENTS

| | | | | |
|---|---|---|---|---|
| 5,106,197 A | * | 4/1992 | Ohuchida | G02F 1/1362 |
| | | | | 349/122 |
| 5,903,328 A | * | 5/1999 | Greene | G06F 3/147 |
| | | | | 345/1.3 |
| 6,177,912 B1 | | 1/2001 | Izumi | |
| 2016/0062132 A1 | * | 3/2016 | Park | G02F 1/13336 |
| | | | | 428/58 |
| 2017/0228209 A1 | * | 8/2017 | Watanabe | G06F 3/1446 |
| 2020/0163233 A1 | | 5/2020 | Brackley et al. | |
| 2020/0243738 A1 | * | 7/2020 | Feng | G02F 1/13452 |

FOREIGN PATENT DOCUMENTS

JP 2016142808 A 8/2016

* cited by examiner

*Primary Examiner* — Phu Vu
(74) *Attorney, Agent, or Firm* — NIXON & VANDERHYE

(57) ABSTRACT

An aspect of this disclosure is a display device including a support substrate, a first display panel that is bonded to a first face of the support substrate with a first bonding region, and a second display panel that is bonded to the first face of the support substrate with a second bonding region. The first display panel includes a first glass substrate. The second display panel includes a second glass substrate. A first end face of the first glass substrate and a second end face of the second glass substrate are opposed to each other. The first end face and the second end face have a surface roughness Ra not higher than 0.5 μm.

8 Claims, 14 Drawing Sheets

| SURFACE ROUGHNESS Ra | 0.2μm | 0.5μm | 1.0μm | 2.0μm | UNPOLISHED (FRACTURE SURFACE) |
|---|---|---|---|---|---|
| PRESS AGAINST CONTACT SURFACE | NIL | 2 PIECES | APPROX. DOZEN PIECES | SEVERAL DOZENS PIECES | NUMEROUS PIECES |
| SLIDE ON CONTACT SURFACE | 1 PIECE | APPROX. 5 PIECES | MANY PIECES LIKE A DOTTED LINE | NUMEROUS PIECES LIKE A THIN LINE | NUMEROUS PIECES LIKE A THICK LINE |

*FIG. 5*

DISPLAY DEVICE

CROSS-REFERENCE TO RELATED APPLICATIONS

This non-provisional application claims priority under 35 U.S.C. § 119(a) on Patent Application No. 2022-209740 filed in Japan on Dec. 27, 2022, the entire content of which is hereby incorporated by reference.

BACKGROUND

This disclosure relates to a display device.

Some on-vehicle display devices employ a design such that a plurality of display panels are mounted on the dashboard as a center information display (CID) or an instrument cluster. In recent years, such display devices have been requested to have a larger size or unity with the shape design of the dashboard in order to display more service information. Especially for a design such that display panels are disposed in parallel, development of a display device having a narrow frame (non-displaying region) between display panels is demanded.

SUMMARY

An aspect of this disclosure is a display device including a support substrate, a first display panel that is bonded to a first face of the support substrate with a first bonding region, and a second display panel that is bonded to the first face of the support substrate with a second bonding region. The first display panel includes a first glass substrate. The second display panel includes a second glass substrate. A first end face of the first glass substrate and a second end face of the second glass substrate are opposed to each other. The first end face and the second end face have a surface roughness Ra not higher than 0.5 μm.

It is to be understood that both the foregoing general description and the following detailed description are exemplary and explanatory and are not restrictive of this disclosure.

BRIEF DESCRIPTION OF THE DRAWINGS

FIG. 5 provides results of measurement by the inventors.

EMBODIMENTS

Hereinafter, embodiments of this disclosure will be described with reference to the accompanying drawings. It should be noted that the embodiments are merely examples to implement this disclosure and are not to limit the technical scope of this disclosure.

An embodiment of this specification discloses a tiled display device in which a plurality of display panels are disposed side by side and bonded to a support substrate. The display panels can be liquid crystal display panels, organic light-emitting diode (OLED) display panels, or micro-LED display panels. The plurality of display panels are bonded onto the same main face (first face) of the support substrate. The bonding surfaces of the electroluminescent display panels such as OLED display panels and micro-LED display panels can be the front faces or back faces of the display panels. The bonding surfaces of the display panels that require backlight like liquid crystal display panels are their front faces.

In a configuration such that a plurality of display panels are disposed side by side and bonded to one support substrate, each gap between display panels has to be as narrow as possible in order to make a joint between display panels called a seam inconspicuous. However, if the gap between display panels is too narrow, thermal contraction or vibration of the cover panel causes contact of end faces of the adjacent display panels; glass cullet could be generated or the display panels themselves could be broken to cause display failure. The glass cullet may move to the front or the back of a display panel to cause display failure.

An embodiment of this specification polishes the opposed end faces of adjacent display panels (a first display panel and a second display panel) into almost mirrors or mirrors smoother than the almost mirrors. This process reduces the possibility of generation of glass cullet or a break of a display panel caused by contact between the adjacent display panels. In an embodiment of this specification, the surface roughness Ra of the opposed end faces is not more than 0.5 µm. Still further, the surface roughness Ra of the end faces can be not more than 0.2 µm. This configuration effectively reduces the possibility of generation of glass cullet or a break of a display panel caused by contact between adjacent display panels.

Figure 1:
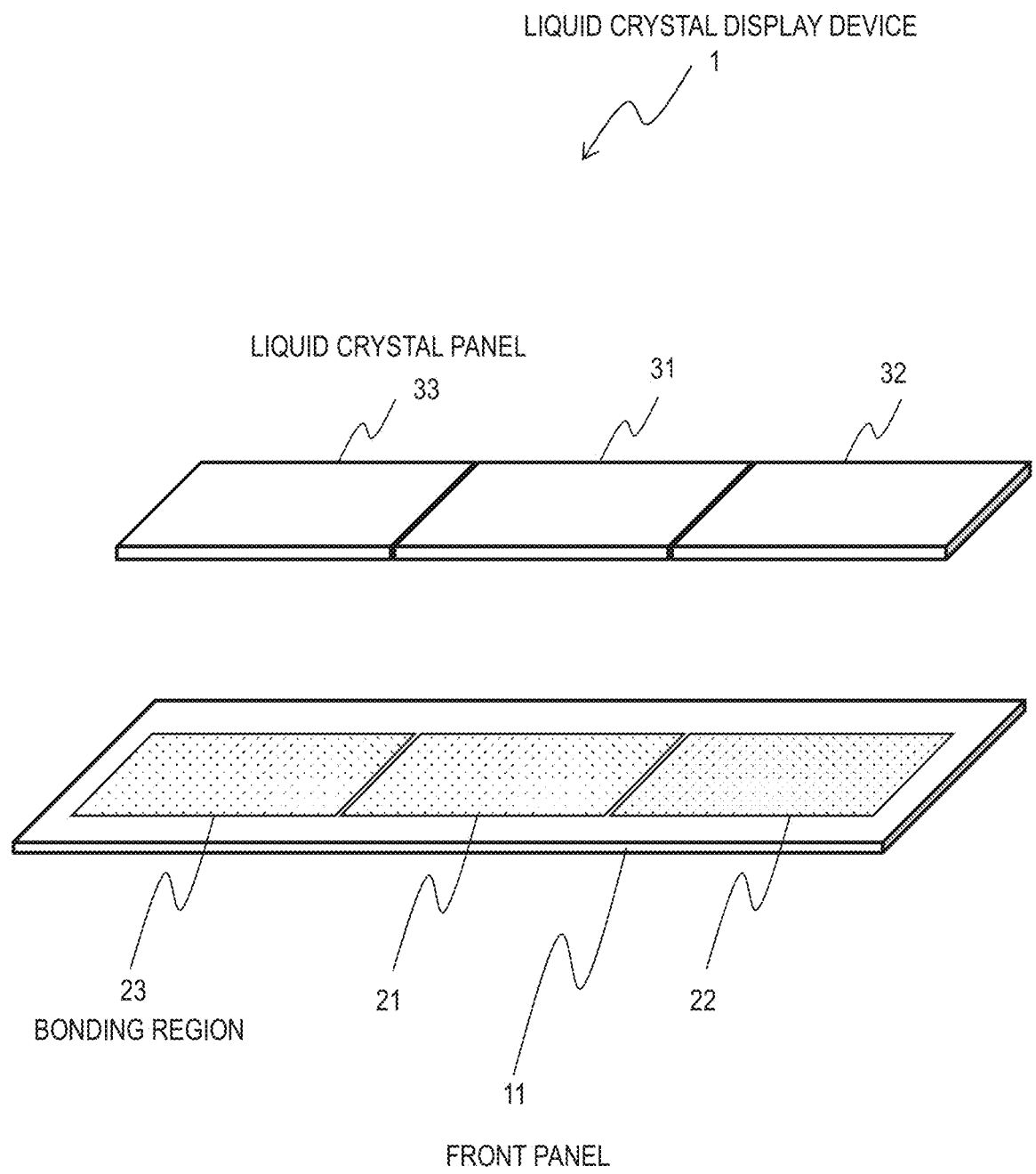
FIG. 1 is an exploded perspective diagram schematically illustrating a configuration example of a part of a liquid crystal display device in an embodiment of this specification.

FIG. 1 is an exploded perspective diagram schematically illustrating a configuration example of a part of a liquid crystal display device in an embodiment of this specification. In this description, the side of the liquid crystal display device to display an image to be seen by the user is referred to as front side and the opposite side as rear side or back side.

The liquid crystal display device 1 includes a front panel 11 of a support substrate having transmissivity to visible light and a plurality of liquid crystal display panels disposed in parallel behind the front panel 11. A liquid crystal display panel can also be simply referred to as liquid crystal panel. FIG. 1 includes three liquid crystal panels 31, 32, and 33 by way of example. The liquid crystal display device 1 further includes not-shown one or more backlight units disposed behind the liquid crystal panels 31, 32, and 33.

In the following, liquid crystal display panels are described as examples of display panels. The features of this disclosure are applicable to display devices including other kinds of display panels, such as OLED display panels and micro-LED display panels. The OLED display panels or the micro-LEDs are not limited to a specific type.

The main face of the front panel 11 is flat and has a rectangular shape in a planar view (when viewed in the direction normal to the main face). The main face of the front panel 11 can be curved, instead of being flat. The shape of the front panel 11 is not limited to a rectangle; the front panel 11 can have any shape suitable for installation, depending on the design. The front panel 11 is either colorless and transparent or colored and transparent; it can be made of glass or resin. The front panel 11 can have a touch panel function, for example. Further, an antireflection coating or film and/or a shatter-proof film can be provided depending on the use environment or usage.

In this configuration example, the three liquid crystal panels 31, 32, and 33 are disposed on the rear main face of the front panel 11. The front panel 11 covers the whole liquid crystal panels 31, 32, and 33 when viewed from the front. The outlines of the liquid crystal panels 31, 32, and 33 are located inner than the outline of the front panel 11. The number of liquid crystal panels disposed on the front panel 11 and the layout of the liquid crystal panels are not limited to this example; any layout suitable for installation can be employed depending on the appearance of the apparatus to include the display device and the design to achieve the appearance.

The liquid crystal panels 31, 32, and 33 have flat main faces. Images are displayed on the front main faces. In another configuration example, the liquid crystal panels 31, 32, and 33 can have curved main faces. Although the liquid crystal panels 31, 32, and 33 in the configuration example of FIG. 1 have rectangular shapes, their shapes are not limited to a rectangle but can be other polygons or include a curved outline.

Each of the liquid crystal panels 31, 32, and 33 includes resin or glass substrates opposed to each other and liquid crystal material therebetween. The liquid crystal panels 31, 32, and 33 can have any configuration, for example, a vertical electric field type or a horizontal electric field type and a color type or a monochrome type.

The front main faces of the liquid crystal panels 31, 32, and 33 are bonded to the rear main face of the front panel 11 by the bonding regions 21, 22, and 23. The bonding regions 21, 22, and 23 can be made of transparent resin and they are in direct contact with the front panel 11 and the liquid crystal panels 31, 32, and 33. The bonding regions 21, 22, and 23 can be double-sided adhesive tapes or silicone or acrylic resin cured with UV light, heat, or moisture.

In the configuration example of FIG. 1, the outlines of the bonding regions 21, 22, and 23 are located inner than the outlines of the front main faces of the liquid crystal panels 31, 32, and 33. In an example, the bonding regions 21, 22, and 23 cover the entire display regions of the liquid crystal panels 31, 32, and 33. There is a gap between the bonding regions 21 and 22 adjacent to each other and there is another gap between the bonding regions 21 and 23 adjacent to each other. The bonding regions 21, 22, and 23 can be parts of one bonding region.

Figure 2:
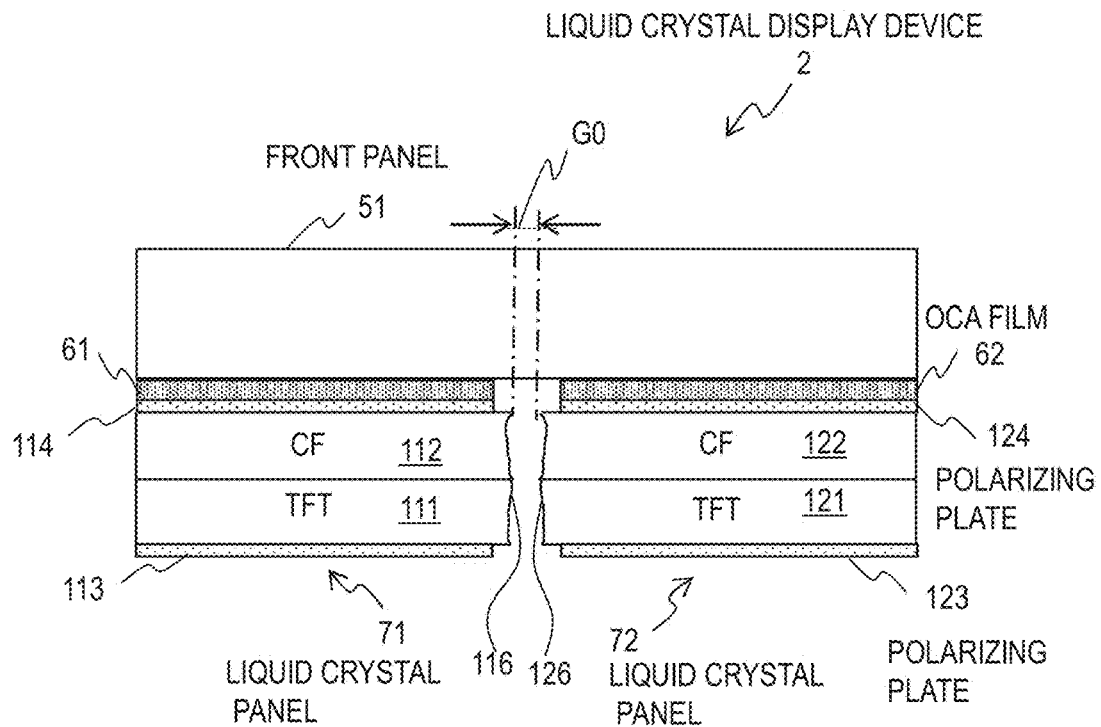
FIG. 2 schematically illustrates a configuration of a part of a liquid crystal display device in a related art.

FIG. 2 schematically illustrates a configuration of a part of a liquid crystal display device 2 in a related art. The liquid crystal display device 2 includes a front panel 51 and liquid crystal panels 71 and 72 disposed adjacent to each other behind the front panel 51. In FIG. 2, the upper side is the front. The liquid crystal panels 71 and 72 are color liquid crystal panels.

The liquid crystal panel 71 includes a thin-film transistor (TFT) substrate 111 including a TFT array fabricated on a glass substrate and a color filter (CF) substrate 112 including a color filter fabricated on a glass substrate. The opposed faces of the TFT substrate 111 and the CF substrate 112 are bonded with a sealer (not shown) and liquid crystal material (not shown) is enclosed in the space surrounded by the sealer. Polarizing plates 113 and 114 are provided on the back of the TFT substrate 111 and the front of the CF substrate 112. The back face of the front panel 51 and the front face of the polarizing plate 114 are bonded with an optical clear adhesive (OCA) film 61.

The liquid crystal panel 72 includes a TFT substrate 121 and a CF substrate 122. The opposed faces of the TFT substrate 121 and the CF substrate 122 are bonded with a sealer (not shown) and liquid crystal material (not shown) is enclosed in the space surrounded by the sealer. Polarizing plates 123 and 124 are provided on the back of the TFT substrate 121 and the front of the CF substrate 122. The back face of the front panel 51 and the front face of the polarizing plate 124 are bonded with an OCA film 62.

An end face (side face) 116 of the liquid crystal panel 71 and an end face (side face) 126 of the liquid crystal panel 72 are opposed to each other. The end faces 116 and 126 are distant without a contact and there is a gap G0 between the end faces 116 and 126. This gap G0 provides a wide non-displaying region to impair the display quality. The end faces 116 and 126 are rough surfaces including microcracks, bumps, and dips. The liquid crystal panels 71 and 72 are cut out from a motherboard by scribing and breaking. The end faces 116 and 126 are unpolished fracture surfaces.

When the front panel 51 of the liquid crystal display device 2 contracts or deforms, the end face 116 of the liquid crystal panel 71 and the end face 126 of the liquid crystal panel 72 may contact each other. Since the end faces 116 and 126 are rough surfaces, their contact may generate glass cullet or a break of the liquid crystal panels 71 and 72.

Figure 3:
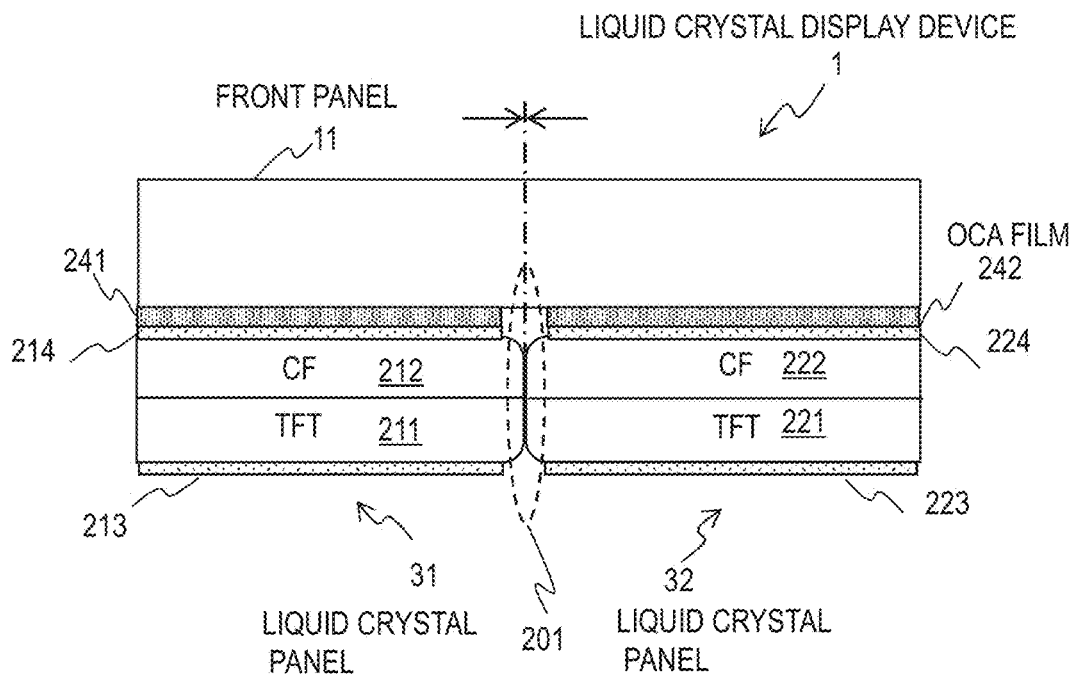
FIG. 3 is a cross-sectional diagram schematically illustrating the configuration of a part of a liquid crystal display device 1 in an embodiment of this specification.

FIG. 3 is a cross-sectional diagram schematically illustrating the configuration of a part of a liquid crystal display device 1 in an embodiment of this specification. FIG. 3 illustrates a front panel 11 and liquid crystal panels 31 and 32 disposed adjacent to each other behind the front panel 11. In FIG. 3, the upper side is the front. The front panel 11 has a uniform thickness and its front face and back face are parallel. In a plurality of configuration examples to be described in the following, the front panel 11 has a uniform thickness in the region where the liquid crystal panels are bonded, unless specified otherwise.

The liquid crystal panels 31 and 32 are color liquid crystal panels. The liquid crystal panels can be monochrome liquid crystal panels. Various types of liquid crystal panels and configurations thereof are known; any type of liquid crystal panels can be employed. Configurations of various types of liquid crystal panels are widely known; their detailed description is skipped in this specification.

The liquid crystal panel 31 includes a TFT substrate 211 including a TFT array fabricated on a glass substrate and a CF substrate 212 including a color filter fabricated on a glass substrate. The CF substrate 212 is an opposite substrate opposed to the TFT substrate 211. The opposed faces of the TFT substrate 211 and the CF substrate 212 are bonded with a sealer (not shown) and liquid crystal material (not shown) is enclosed in the space surrounded by the sealer.

Polarizing plates 213 and 214 are provided on the back of the TFT substrate 211 and the front of the CF substrate 212. The back face of the front panel 11 and the front face of the polarizing plate 214 are bonded with an OCA film 241, which is an example of the bonding region 21.

The liquid crystal panel 32 includes a TFT substrate 221 including a TFT array fabricated on a glass substrate and a CF substrate 222 including a color filter fabricated on a glass substrate. The CF substrate 222 is an opposite substrate opposed to the TFT substrate 221. The opposed faces of the TFT substrate 221 and the CF substrate 222 are bonded with a sealer (not shown) and liquid crystal material (not shown) is enclosed in the space surrounded by the sealer.

Polarizing plates 223 and 224 are provided on the back of the TFT substrate 221 and the front of the CF substrate 222. The back face of the front panel 11 and the front face of the polarizing plate 224 are bonded with an OCA film 242, which is an example of the bonding region 22.

Other kinds of display panels different from the liquid crystal panel can be structured to have one glass substrate, instead of the multi-substrate structure. For example, an OLED display panel includes a TFT array and light-emitting elements fabricated on one glass substrate; they can be covered with a resin layer of a structural encapsulation unit.

In the example of FIG. 3, the OCA films 241 and 242 have an equal thickness. Accordingly, the distance between the front face of the liquid crystal panel 31 (the front face of the polarizing plate 214) and the back face of the front panel 11 is equal to the distance between the front face of the liquid crystal panel 32 (the front face of the polarizing plate 224) and the back face of the front panel 11. The OCA films 241 and 242 are made of the same material and their elastic moduli are the same. The elastic modulus can be not less than 30 kPa and not more than 140 kPa. This value for the elastic modulus is applicable to the other configuration examples. In the plurality of configuration examples to be described in the following, each member has a substantially uniform thickness unless specified otherwise.

The liquid crystal panels 31 and 32 have an equal thickness. More specifically, the polarizing plates 214 and 224 have an equal thickness; the CF substrates 212 and 222 have an equal thickness; the TFT substrates 211 and 221 have an equal thickness; and the polarizing plates 213 and 223 have an equal thickness.

The oval region 201 surrounded by a dashed line represents the border between the liquid crystal panels 31 and 32 including their opposed end regions. The end regions of the liquid crystal panels 31 and 32 are opposed in the direction parallel to the main faces and in contact with each other. The front faces and the back faces of the liquid crystal panels 31 and 32 are the wide main faces.

Figure 4:
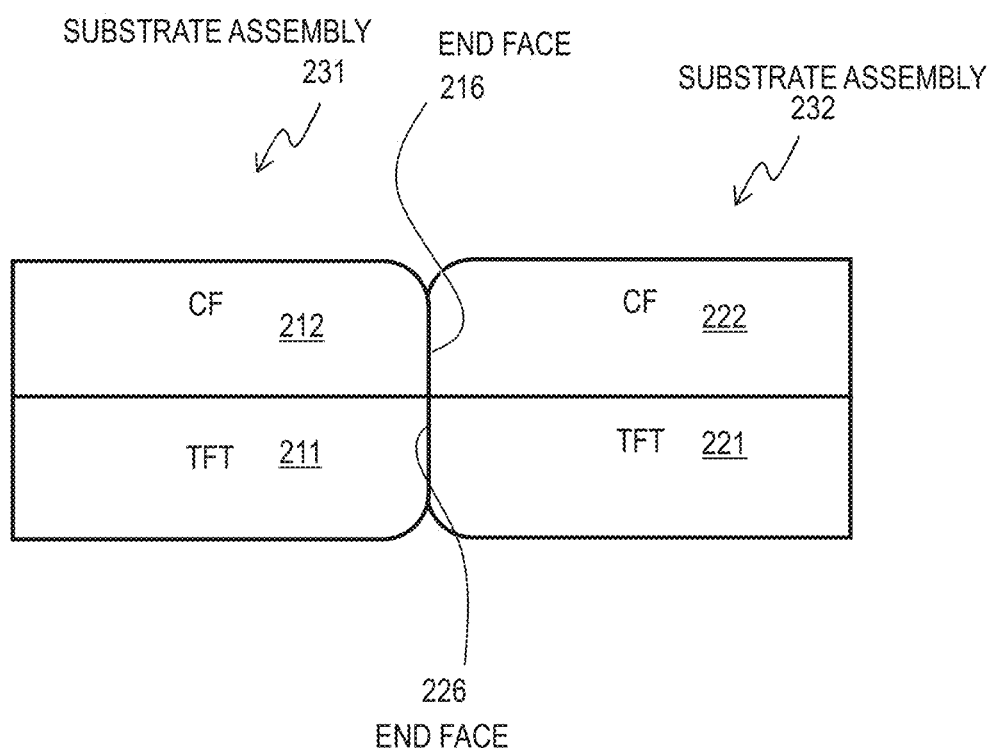
FIG. 4 schematically illustrates the configuration of end regions of substrate assemblies of liquid crystal panels.

FIG. 4 schematically illustrates the configuration of end regions of substrate assemblies 231 and 232 of the liquid crystal panels 31 and 32. The substrate assembly 231 consists of the TFT substrate 211 and the CF substrate 212 laid one above the other and the substrate assembly 232 consists of the TFT substrate 221 and the CF substrate 222 laid one above the other. As described above, the substrate assemblies 231 and 232 have an equal thickness.

The substrate assembly 231 has an end face 216 and the substrate assembly 232 has an end face 226. The end face 216 consists of an end face of the TFT substrate 211 and an end face of the CF substrate 212 that are flush to each other. There is a tiny gap between these end faces. The end face 226 consists of an end face of the TFT substrate 221 and an end face of the CF substrate 222 that are flush to each other. There is a tiny gap between these end faces.

The end faces 216 and 226 are opposed to and in contact with each other. This configuration provides the liquid crystal display device 1 with high display quality. Their contact surfaces are flat and accordingly, the end faces 216 and 226 are in planar contact. The end faces 216 and 226 can be usually distant and come in contact when the front panel 11 deforms (including contracts). The end face 216 is perpendicular to the front face of the substrate assembly 231 and the end face 226 is perpendicular to the front face of the substrate assembly 232. As illustrated in FIG. 3, the end faces 216 and 226 are perpendicular to the back face of the front panel 11. In the example of FIGS. 3 and 4, the front faces and the back faces of the substrate assemblies 231 and 232 are parallel (the substrate assemblies 231 and 232 have a uniform thickness) and the front face and the back face of the front panel 11 are parallel (the front panel 11 has a uniform thickness). The main faces of the front panel 11 and the substrate assemblies 231 and 323 are flat.

An embodiment of this specification configures the opposed end faces of adjacent liquid crystal panels with smooth surfaces. In the configuration example of FIGS. 3 and 4, the opposed end faces 216 and 226 have smooth surfaces. Specifically, the end faces 216 and 226 are finished to have a surface roughness Ra lower than a predetermined value. This configuration reduces the generation of glass cullet. Forming a smooth surface polishes the fracture surface to remove the micro-cracks, bumps, and dips generated in cutting out individual substrate assemblies from a motherboard.

FIG. 5 provides results of measurement by the inventors. Each measurement result indicates the relation between the surface roughness Ra of the end faces of the liquid crystal panels and the glass cullet generated by contact between the end faces. The measurement made the end faces of the liquid crystal panels contact in two different ways. One of the ways is pressing one liquid crystal panel against the other in the state where their end faces are in contact with each other. The other way is sliding one liquid crystal panel on the other in the state where their end faces are in contact with each other.

The measurement results in FIG. 5 indicate that the generation of glass cullet was significantly reduced when the surface roughness Ra of the end faces was not more than 0.5 μm. The measurement results further indicate that the generation of glass cullet was substantially eliminated when the surface roughness Ra of the end faces was not more than 0.2 μm.

An embodiment of this specification determines that the surface roughness Ra of the end faces 216 and 226 is not more than 0.5 μm and not less than 0.0 μm. This configuration effectively reduces the generation of glass cullet caused by a contact or change of the state of contact between the end faces 216 and 226. When the surface roughness Ra of the end faces 216 and 226 is not more than 0.2 μm, the generation of glass cullet can be reduced more effectively. The surface roughness Ra of the end faces 216 and 226 can be determined to be not more than 0.3 μm, which corresponds to an almost mirror. The surface roughness of the regions of the opposed end faces that are in contact with or come in contact with each other in use of the liquid crystal display device 1 can be in the aforementioned range. For example, the entire end faces can have a surface roughness in the aforementioned range.

The end faces of liquid crystal panels can have various shapes. Hereinafter, end faces in some embodiments of this specification are described.

Figure 6:
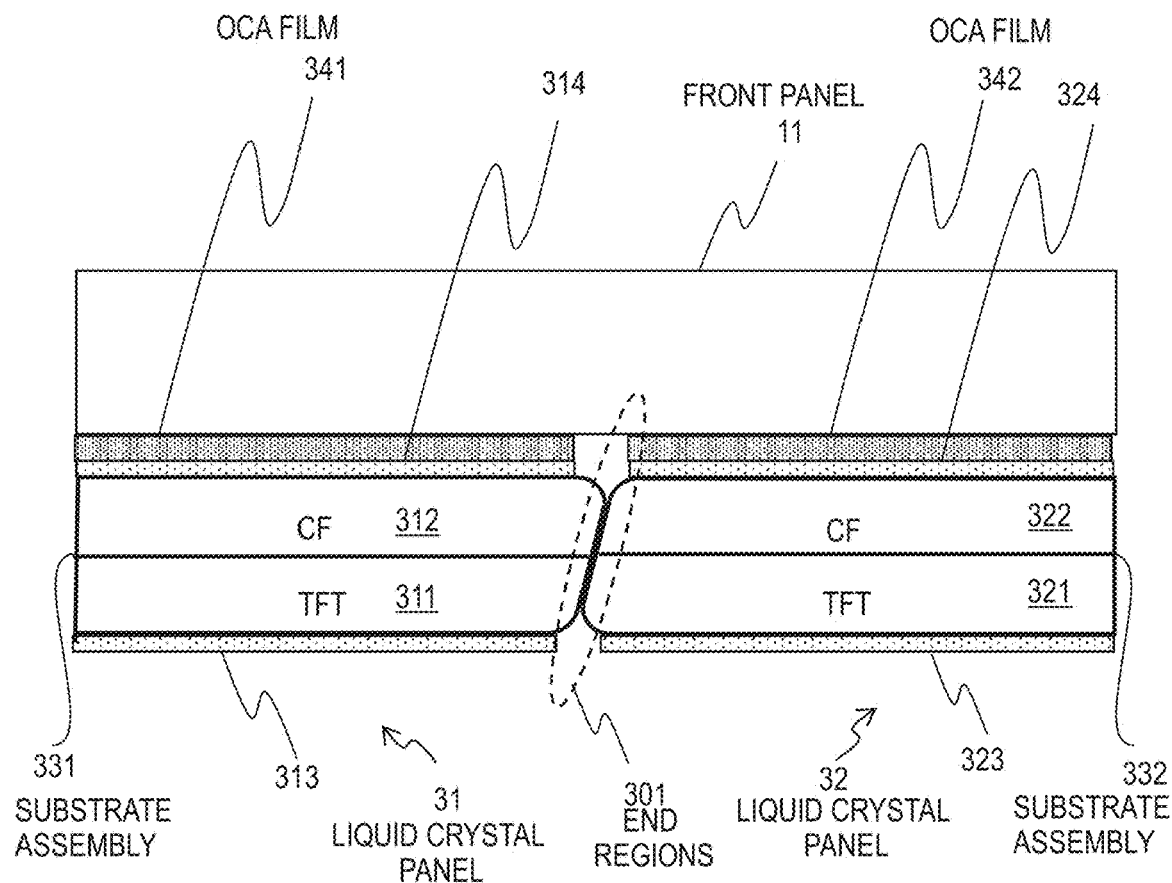
FIG. 6 is a cross-sectional diagram schematically illustrating the configuration of a part of a liquid crystal display device in another embodiment of this specification.

FIG. 6 is a cross-sectional diagram schematically illustrating the configuration of a part of a liquid crystal display device 1 in another embodiment of this specification. FIG. 6 illustrates a front panel 11 and liquid crystal panels 31 and 32 disposed adjacent to each other behind the front panel 11. In FIG. 6, the upper side is the front. The liquid crystal panels 31 and 32 are color liquid crystal panels. Various types of liquid crystal panels and configurations thereof are known; any type of liquid crystal panels can be employed.

The liquid crystal panel 31 includes a TFT substrate 311 including a TFT array fabricated on a glass substrate and a CF substrate 312 including a color filter fabricated on a glass substrate. The CF substrate 312 is an opposite substrate opposed to the TFT substrate 311. The opposed faces of the TFT substrate 311 and the CF substrate 312 are bonded with a sealer (not shown) and liquid crystal material (not shown) is enclosed in the space surrounded by the sealer.

Polarizing plates 313 and 314 are provided on the back of the TFT substrate 311 and the front of the CF substrate 312. The back face of the front panel 11 and the front face of the polarizing plate 314 are bonded with an OCA film 341, which is an example of the bonding region 21.

The liquid crystal panel 32 includes a TFT substrate 321 including a TFT array fabricated on a glass substrate and a CF substrate 322 including a color filter fabricated on a glass substrate. The CF substrate 322 is an opposite substrate opposed to the TFT substrate 321. The opposed faces of the TFT substrate 321 and the CF substrate 322 are bonded with a sealer (not shown) and liquid crystal material (not shown) is enclosed in the space surrounded by the sealer.

Polarizing plates 323 and 324 are provided on the back of the TFT substrate 321 and the front of the CF substrate 322. The back face of the front panel 11 and the front face of the polarizing plate 324 are bonded with an OCA film 342, which is an example of the bonding region 22.

Other kinds of display panels different from the liquid crystal panel can be structured to have one glass substrate, instead of the multi-substrate structure. For example, an OLED display panel includes a TFT array and light-emitting elements fabricated on one glass substrate; they can be covered with a resin layer of a structural encapsulation unit.

In the example of FIG. 6, the OCA films 341 and 342 have an equal thickness. Accordingly, the distance between the front face of the liquid crystal panel 31 (the front face of the polarizing plate 314) and the back face of the front panel 11 is equal to the distance between the front face of the liquid crystal panel 32 (the front face of the polarizing plate 324) and the back face of the front panel 11. The OCA films 341 and 342 are made of the same material and their elastic moduli are the same.

The liquid crystal panels 31 and 32 have an equal thickness. More specifically, the polarizing plates 314 and 324 have an equal thickness; the CF substrates 312 and 322 have an equal thickness; the TFT substrates 311 and 321 have an equal thickness; and the polarizing plates 313 and 323 have an equal thickness. The oval region 301 surrounded by a dashed line represents the border between the liquid crystal panels 31 and 32 including their opposed end regions. The end regions of the liquid crystal panels 31 and 32 are opposed in the direction parallel to the main faces and in contact with each other.

Figure 7:
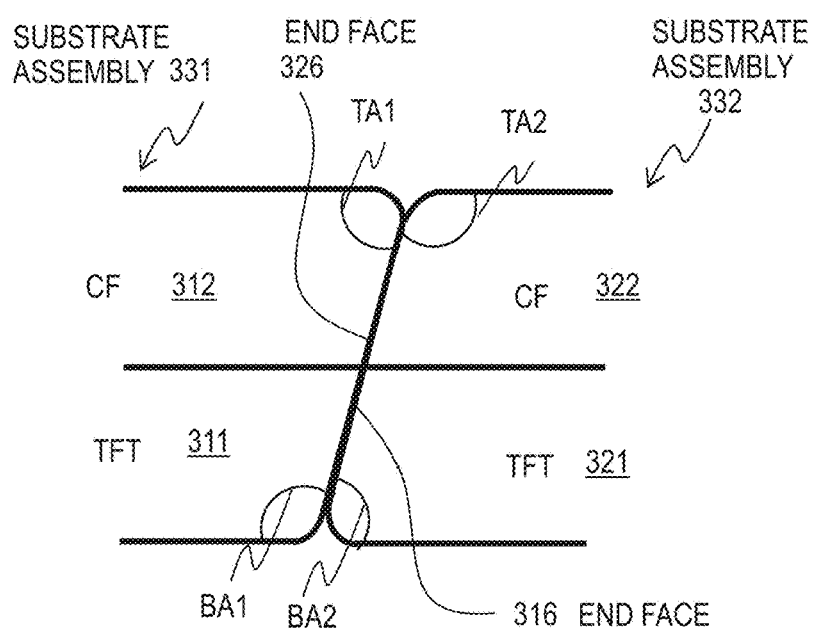
FIG. 7 schematically illustrates the configuration of end regions of substrate assemblies of liquid crystal panels.

FIG. 7 schematically illustrates the configuration of end regions of substrate assemblies 331 and 332 of the liquid crystal panels 31 and 32. The substrate assembly 331 consists of the TFT substrate 311 and the CF substrate 312 laid one above the other and the substrate assembly 332 consists of the TFT substrate 321 and the CF substrate 322 laid one above the other. As described above, the substrate assemblies 331 and 332 have an equal thickness.

The substrate assembly 331 has an end face 316 and the substrate assembly 332 has an end face 326. The end face 316 consists of an end face of the TFT substrate 311 and an end face of the CF substrate 312 flush to each other. There is a tiny gap between these end faces. The end face 326 consists of an end face of the TFT substrate 321 and an end face of the CF substrate 322 flush to each other. There is a tiny gap between these end faces.

The end faces 316 and 326 have the same surface roughness Ra as the end faces 216 and 226 described with reference to FIGS. 3 to 5. This configuration effectively reduces the generation of glass cullet caused by a contact or change of the state of contact between the end faces 316 and 326. The end faces 316 and 326 are opposed to and in contact with each other. This configuration provides the liquid crystal display device 1 with high display quality. Their contact surfaces are flat and accordingly, the end faces 316 and 326 are in planar contact. The end faces 316 and 326 can be distant from each other.

The end faces 316 and 326 are inclined parallel surfaces opposed to each other. The inclined end face 316 is inclined with respect to the normal to the front face (main face) of the substrate assembly 331 (the CF substrate 312) (the vertical direction in FIGS. 6 and 7). The angle TA1 between the end face 316 and the front face of the substrate assembly 331 is an acute angle. The end face 316 is inclined with respect to the normal to the back face of the front panel 11. The angle between the end face 316 and the back face of the front panel 11 is an acute angle. In the example of FIG. 6, the back face of the front panel 11 and the front face of the substrate assembly 331 are parallel.

The inclined end face 316 is inclined with respect to the normal to the back face (main face) of the substrate assembly 331 (TFT substrate 311) (the vertical direction in FIGS. 6 and 7). The angle BA1 between the end face 316 and the back face of the substrate assembly 331 is an obtuse angle. In the example of FIG. 6, the back face of the front panel 11 and the back face of the substrate assembly 331 are parallel.

The inclined end face 326 is inclined with respect to the normal to the front face (main face) of the substrate assembly 332 (the CF substrate 322) (the vertical direction in FIGS. 6 and 7). The angle TA2 between the end face 326 and the front face of the substrate assembly 332 is an obtuse angle. The end face 326 is inclined with respect to the normal to the back face of the front panel 11. The angle between the end face 326 and the back face of the front panel 11 is an obtuse angle. In the example of FIG. 6, the back face of the front panel 11 and the front face of the substrate assembly 332 are parallel.

The inclined end face 326 is inclined with respect to the normal to the back face (main face) of the substrate assembly 332 (TFT substrate 321) (the vertical direction in FIGS. 6 and 7). The angle BA2 between the end face 326 and the back face of the substrate assembly 332 is an acute angle. In the example of FIG. 6, the back face of the front panel 11 and the back face of the substrate assembly 332 are parallel. In the example of FIGS. 6 and 7, the front faces and the back faces of the substrate assemblies 331 and 332 are parallel (the substrate assemblies 331 and 332 have a uniform thickness) and the front face and the back face of the front panel 11 are parallel (the front panel 11 has a uniform thickness). The main faces of the front panel 11 and the substrate assemblies 331 and 332 are flat.

The angle TA1 is equal to the angle BA2 and the angle BA1 is equal to the angle TA2. The angles TA1 and BA2 can be an obtuse angle and the angles BA1 and TA2 can be an acute angle.

Figure 8:
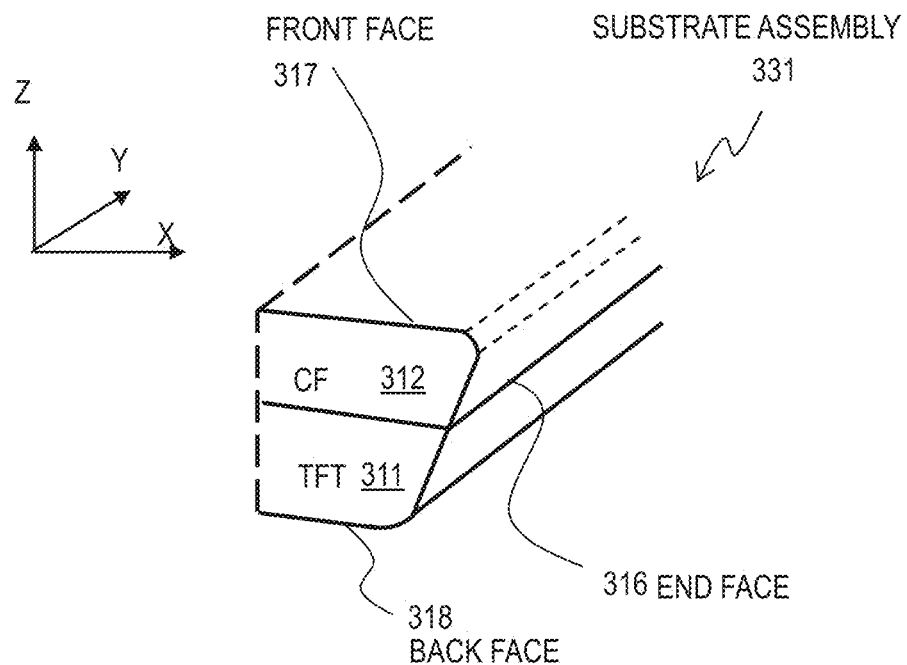
FIG. 8 is a perspective diagram schematically illustrating the configuration of a part of a substrate assembly.

FIG. 8 is a perspective diagram schematically illustrating the configuration of a part of the substrate assembly 331. The axis parallel to the normal to the main face of the front panel 11 is defined as Z-axis, the axis in the direction where the liquid crystal panels 31 and 32 are adjacent to each other as X-axis, and the axis perpendicular to the X-axis and the Z-axis as Y-axis. As described with reference to FIGS. 6 and 7, the end face 316 is a surface inclined with respect to the X-axis and it is not curved but flat. The end face 316 extends along the Y-axis. The end region of the substrate assembly 331 to be opposed to the end region of the substrate assembly 332 has identical cross-sections along the Y-axis for a specific length. The corner between the front face 317 and the end face 316 is round chamfered and the corner between the back face 318 and the end face 316 are round chamfered. The fashion of chamfering can be selected desirably.

Figure 9:
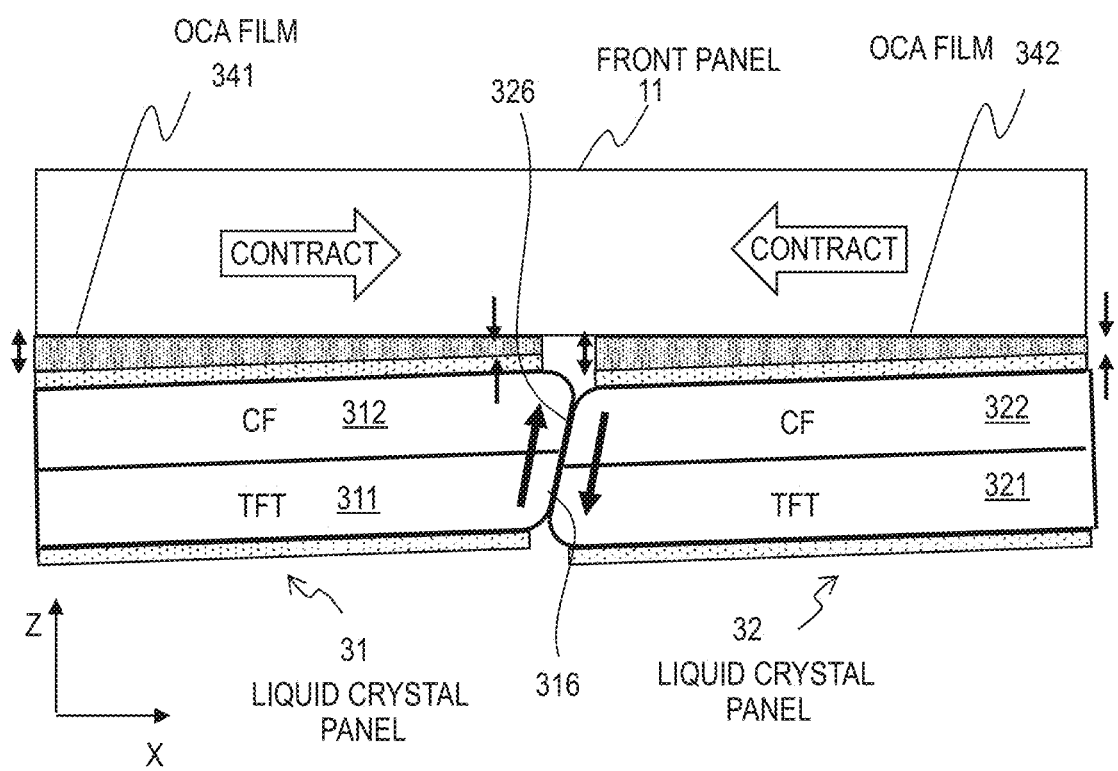
FIG. 9 is a cross-sectional diagram schematically illustrating the movement of the liquid crystal panels when the front panel contracts.

FIG. 9 is a cross-sectional diagram schematically illustrating the movement of the liquid crystal panels 31 and 32 when the front panel 11 contracts. When the front panel 11 contracts along the X-axis, the liquid crystal panels 31 and 32 move to get close to each other. Since the opposed end faces 316 and 326 are inclined parallel surfaces, the end faces 316 and 326 in contact with each other can easily slide in specific directions. As a result, generation of glass cullet is effectively reduced.

As illustrated in FIG. 9, the end face 316 of the liquid crystal panel 31 slides toward the front panel 11 and the end face 326 of the liquid crystal panel 32 slides away from the front panel 11. In FIG. 9, the liquid crystal panels 31 and 32 rotate to the left together with the movement of the end faces 316 and 326. The thickness of the OCA film 341 decreases in the region close to the end face 316 and increases in the opposite region. The thickness of the OCA film 342 increases in the region close to the end face 326 and decreases in the opposite region. The OCA films 341 and 342 have a smaller elastic modulus than the front panel 11, the CF substrates 312 and 322, and the TFT substrates 311 and 321 and therefore, they can deform easily. The elastic modulus can be in the aforementioned range.

Figure 10:
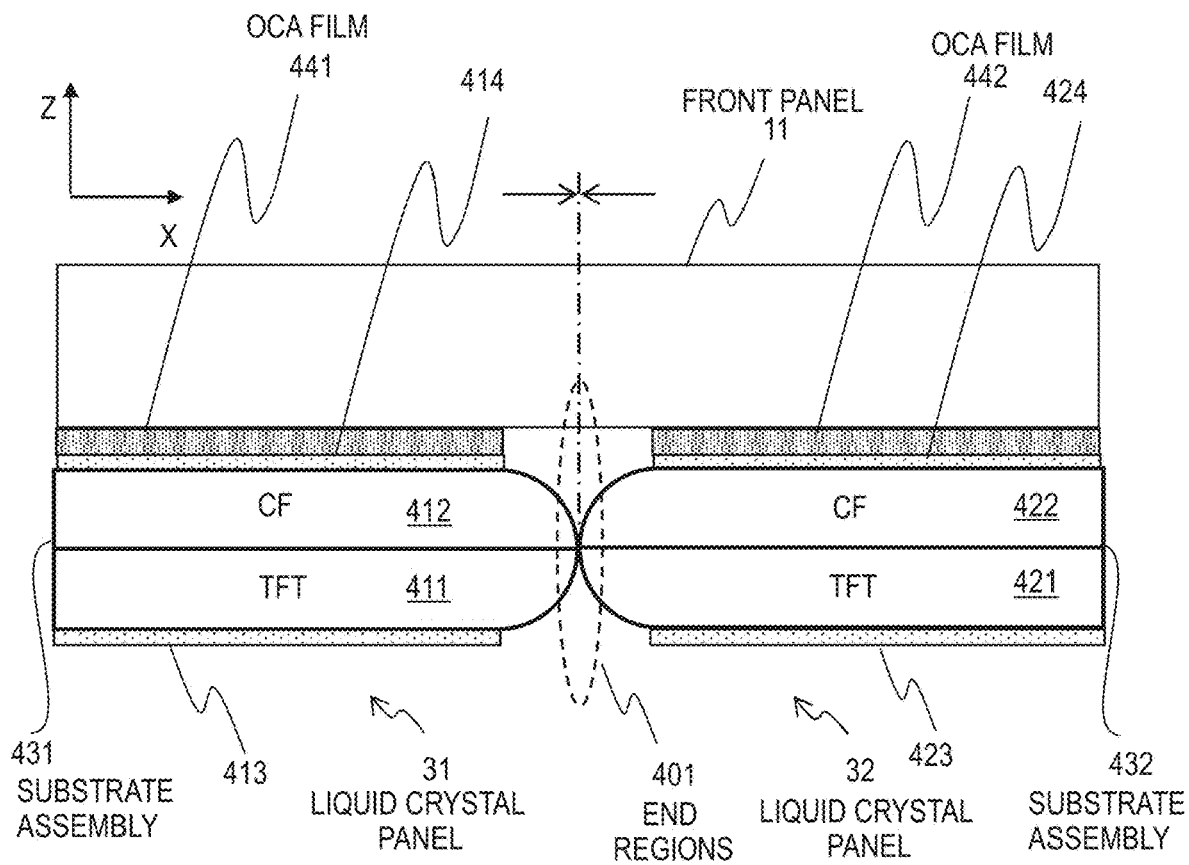
FIG. 10 is a cross-sectional diagram schematically illustrating the configuration of a part of a liquid crystal display device in still another embodiment of this specification.

FIG. 10 is a cross-sectional diagram schematically illustrating the configuration of a part of a liquid crystal display device 1 in still another embodiment of this specification. FIG. 10 illustrates a front panel 11 and liquid crystal panels 31 and 32 disposed adjacent to each other behind the front panel 11. In FIG. 10, the upper side is the front. The liquid crystal panels 31 and 32 are color liquid crystal panels. Various types of liquid crystal panels and configurations thereof are known; any type of liquid crystal panels can be employed.

The liquid crystal panel 31 includes a TFT substrate 411 including a TFT array fabricated on a glass substrate and a CF substrate 412 including a color filter fabricated on a glass substrate. The CF substrate 412 is an opposite substrate opposed to the TFT substrate 411. The opposed faces of the TFT substrate 411 and the CF substrate 412 are bonded with a sealer (not shown) and liquid crystal material (not shown) is enclosed in the space surrounded by the sealer.

Polarizing plates 413 and 414 are provided on the back of the TFT substrate 411 and the front of the CF substrate 412. The back face of the front panel 11 and the front face of the polarizing plate 414 are bonded with an OCA film 441, which is an example of the bonding region 21.

The liquid crystal panel 32 includes a TFT substrate 421 including a TFT array fabricated on a glass substrate and a CF substrate 422 including a color filter fabricated on a glass substrate. The CF substrate 422 is an opposite substrate opposed to the TFT substrate 421. The opposed faces of the TFT substrate 421 and the CF substrate 422 are bonded with a sealer (not shown) and liquid crystal material (not shown) is enclosed in the space surrounded by the sealer.

Polarizing plates 423 and 424 are provided on the back of the TFT substrate 421 and the front of the CF substrate 422. The back face of the front panel 11 and the front face of the polarizing plate 424 are bonded with an OCA film 442, which is an example of the bonding region 22.

Other kinds of display panels different from the liquid crystal panel can be structured to have one glass substrate, instead of the multi-substrate structure. For example, an OLED display panel includes a TFT array and light-emitting elements fabricated on one glass substrate; they can be covered with a resin layer of a structural encapsulation unit.

In the example of FIG. 10, the OCA films 441 and 442 have an equal thickness. Accordingly, the distance between the front face of the liquid crystal panel 31 (the front face of the polarizing plate 414) and the back face of the front panel 11 is equal to the distance between the front face of the liquid crystal panel 32 (the front face of the polarizing plate 424) and the back face of the front panel 11. The OCA films 441 and 442 are made of the same material and their elastic moduli are the same.

The liquid crystal panels 31 and 32 have an equal thickness. More specifically, the polarizing plates 414 and 424 have an equal thickness; the CF substrates 412 and 422 have an equal thickness; the TFT substrates 411 and 421 have an equal thickness; and the polarizing plates 413 and 423 have an equal thickness. The oval region 401 surrounded by a dashed line represents the border between the liquid crystal panels 31 and 32 including their opposed end regions. The end regions of the liquid crystal panels 31 and 32 are opposed in the direction parallel to the main faces and in contact with each other.

Figure 11:
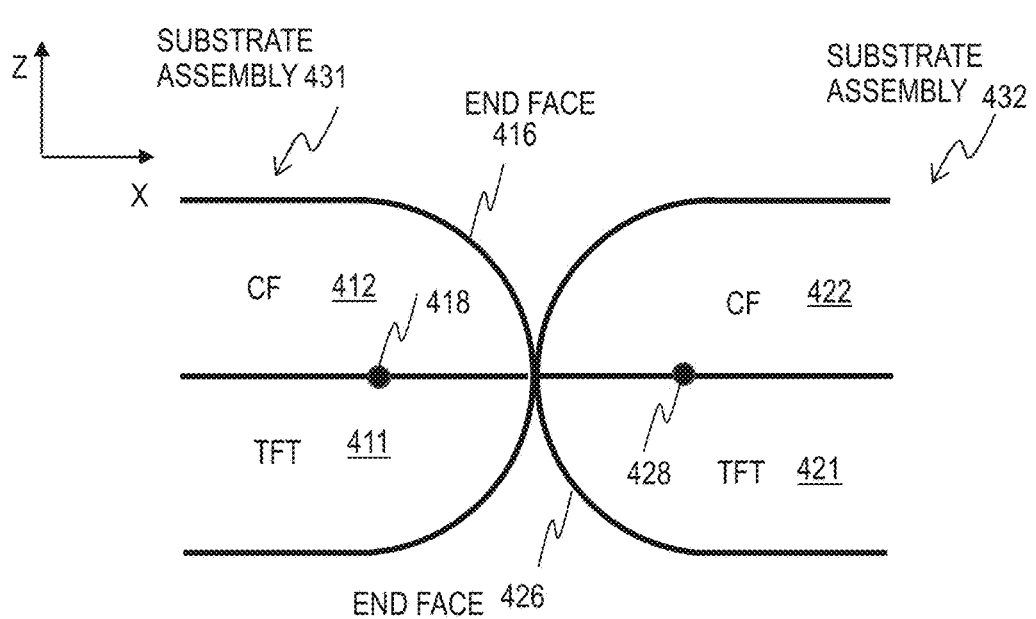
FIG. 11 schematically illustrates the configuration of end regions of substrate assemblies of liquid crystal panels.

FIG. 11 schematically illustrates the configuration of end regions of substrate assemblies 431 and 432 of the liquid crystal panels 31 and 32. The substrate assembly 431 consists of the TFT substrate 411 and the CF substrate 412 laid one above the other and the substrate assembly 432 consists of the TFT substrate 421 and the CF substrate 422 laid one above the other. As described above, the substrate assemblies 431 and 432 have an equal thickness.

The substrate assembly 431 has an end face 416 and the substrate assembly 432 has an end face 426. The end face 416 consists of an end face of the TFT substrate 411 and an end face of the CF substrate 412. There is a tiny gap between these end faces. The end face 426 consists of an end face of the TFT substrate 421 and an end face of the CF substrate 422. There is a tiny gap between these end faces.

The end faces 416 and 426 have the same surface roughness Ra as the end faces 216 and 226 described with reference to FIGS. 3 to 5. This configuration effectively reduces the generation of glass cullet caused by a contact or change of the state of contact between the end faces 416 and 426. The end faces 416 and 426 are opposed to and in contact with each other. This configuration provides the liquid crystal display device 1 with high display quality. The end faces 416 and 426 are curved surfaces and they are in linear contact. The end faces 416 and 426 can be distant from each other.

The end faces 416 and 426 are convex surfaces opposed to each other. The cross-sections of the end faces 416 and 426 are convex arcs and the tips of the end faces 416 and 426 are in contact with each other. In this example, the shapes of the end faces 416 and 426 are identical. The distances from the tips of the end faces 416 and 426 to the back face of the front panel 11 are equal. The distances from the centers of curvature 418 and 428 of the arcs to the back face of the front panel 11 are equal. The end faces 416 and 426 are in contact with each other along a line extending along the Y-axis.

In the example of FIG. 10, the back face of the front panel 11 and the front face of the substrate assembly 431 are parallel. The back face of the front panel 11 and the front face of the substrate assembly 432 are parallel. In the example illustrated in FIGS. 10 and 11, the front faces and the back faces of the substrate assemblies 431 and 432 are parallel (the substrate assemblies 431 and 432 have a uniform thickness) and the front face and the back face of the front panel 11 are parallel (the front panel 11 has a uniform thickness). The main faces of the front panel 11 and the substrate assemblies 431 and 432 are flat.

Figure 12:
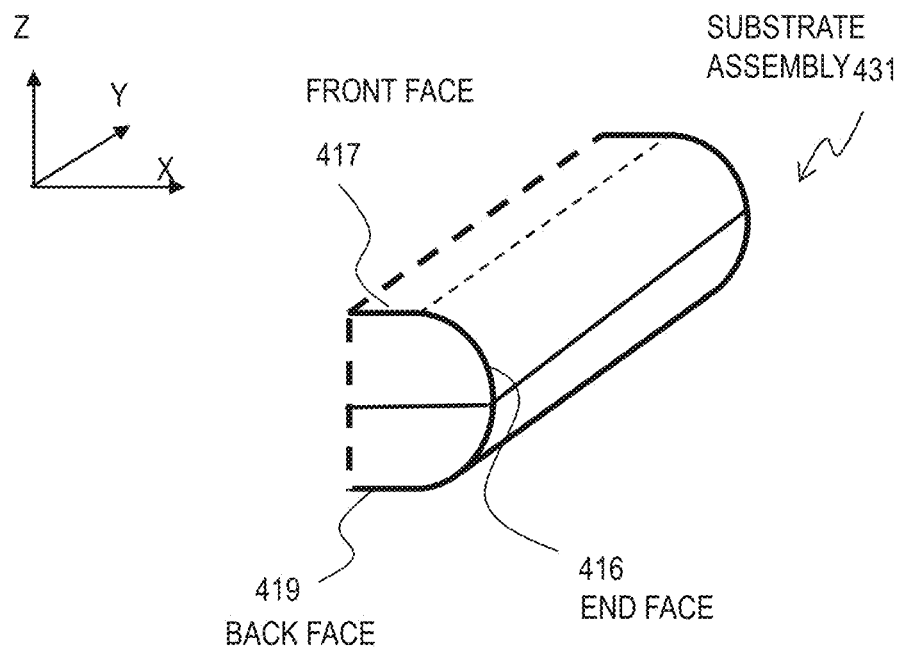
FIG. 12 is a perspective diagram schematically illustrating the configuration of a part of a substrate assembly.

FIG. 12 is a perspective diagram schematically illustrating the configuration of a part of the substrate assembly 431. As described with reference to FIGS. 10 and 11, the end face 416 is a convex surface. The end face 416 is a semi-tubular surface projecting along the X-axis and extending along the Y-axis. The front face 417 and the back face 419 are parallel and flat. The X-axis and the Y-axis are in-plane axes of the front face 417 and the back face 419. The end region of the substrate assembly 431 to be opposed to the end region of the substrate assembly 432 has identical cross-sections along the Y-axis for a specific length.

Figure 13:
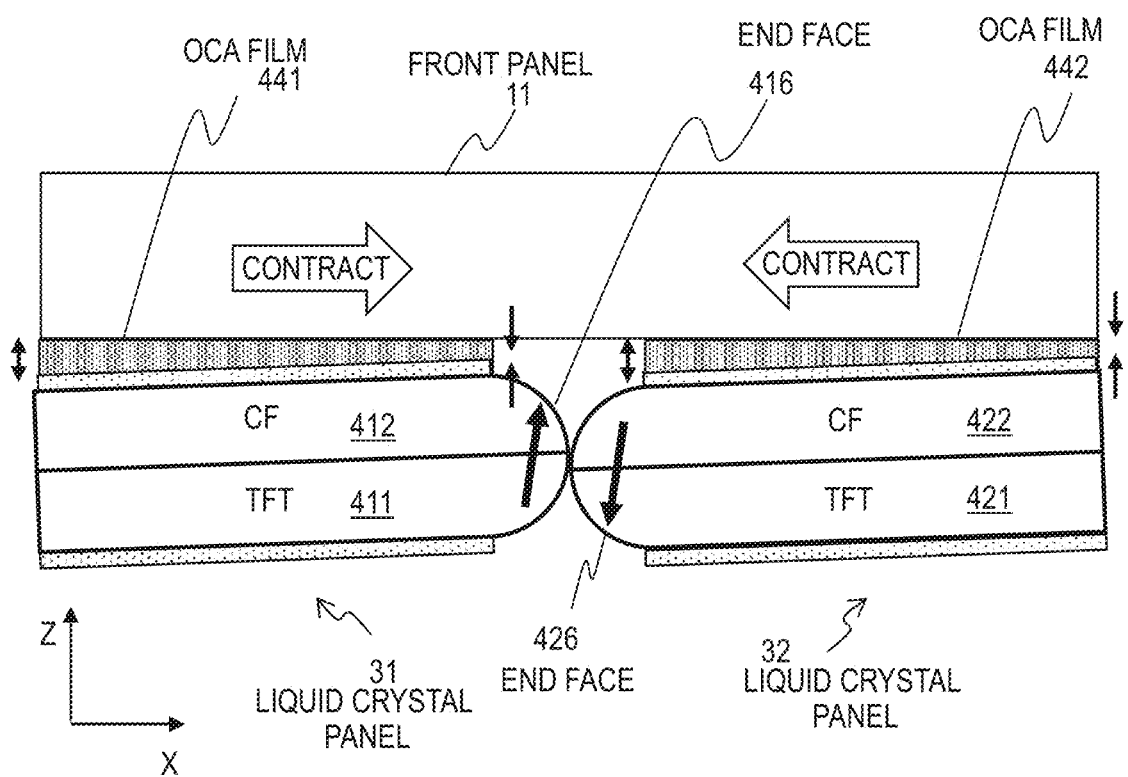
FIG. 13 is a cross-sectional diagram schematically illustrating the movement of the liquid crystal panels when the front panel contracts.

FIG. 13 is a cross-sectional diagram schematically illustrating the movement of the liquid crystal panels 31 and 32 when the front panel 11 contracts. When the front panel 11 contracts, the liquid crystal panels 31 and 32 move along the X-axis to get close to each other. Since the opposed end faces 416 and 426 are curved surfaces, the end faces 416 and 426 in contact with each other can easily slide oppositely. As a result, generation of glass cullet is effectively reduced.

In the example of FIG. 13, the end face 416 of the liquid crystal panel 31 slides toward the front panel 11 and the end face 426 of the liquid crystal panel 32 slides away from the front panel 11. In FIG. 13, the liquid crystal panels 31 and 32 rotate to the left together with the movement of the end faces 416 and 426.

The thickness of the OCA film 441 decreases in the region close to the end face 416 and increases in the opposite region. The thickness of the OCA film 442 increases in the region close to the end face 426 and decreases in the opposite region. The OCA films 441 and 442 have a smaller elastic modulus than the front panel 11, the CF substrates 412 and 422, and the TFT substrates 411 and 421 and therefore, they can deform easily. The elastic modulus can be in the aforementioned range. The end faces 416 and 426 may slide in the opposite directions to the above-described directions.

Since the end faces 416 and 426 are in linear contact, generation of glass cullet can be reduced more effectively in the case of movement along the Y-axis. In addition, the curved end faces 416 and 426 can easily slide when the front panel 11 deforms along the Z-axis; generation of glass cullet can be reduced more effectively.

Figure 14:
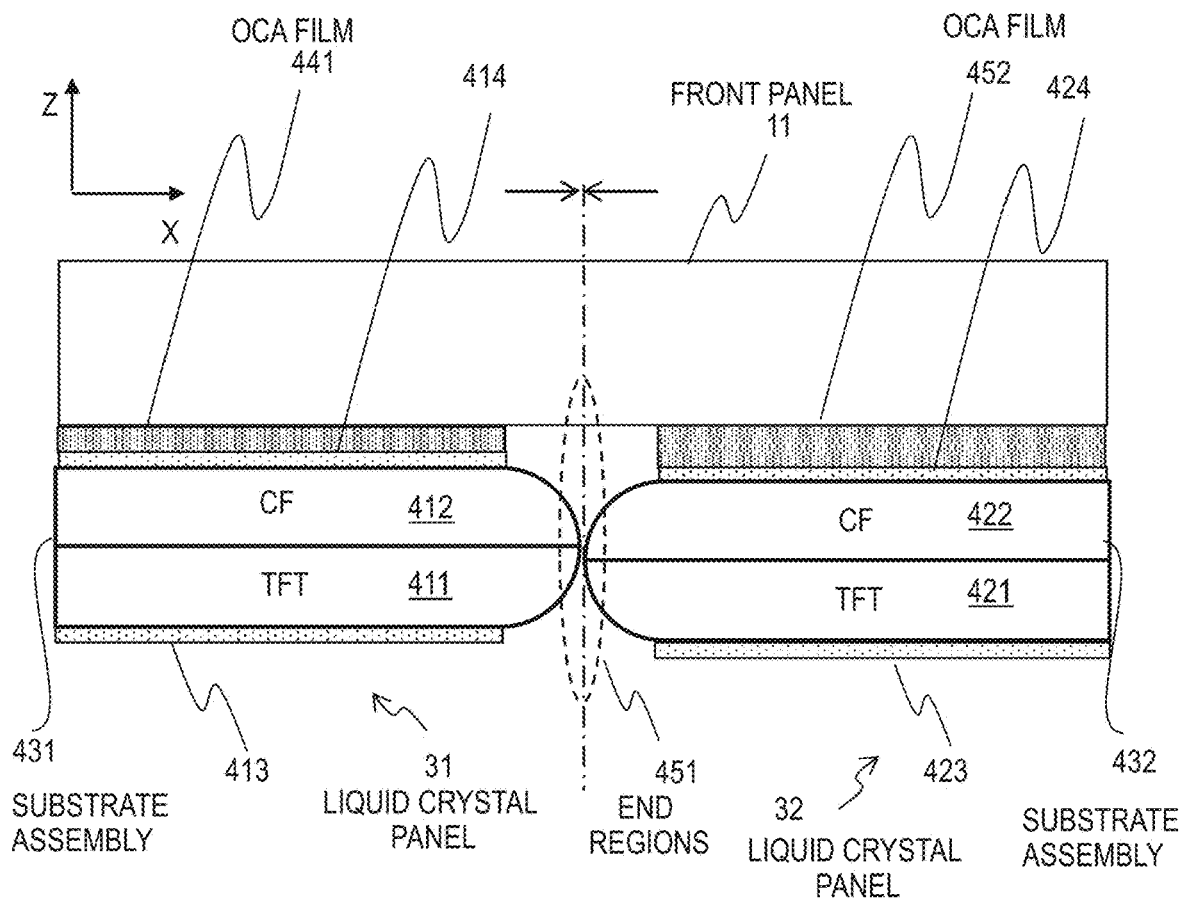
FIG. 14 is a cross-sectional diagram schematically illustrating the configuration of a part of a liquid crystal display device in still another embodiment of this specification.

FIG. 14 is a cross-sectional diagram schematically illustrating the configuration of a part of a liquid crystal display device 1 in still another embodiment of this specification. In the following, differences from the configuration example described with reference to FIGS. 10 to 12 are mainly described. The configuration example in FIG. 14 includes an OCA film 452 in place of the OCA film 442 in the configuration example of FIG. 10. The OCA film 452 is thicker than the OCA film 441. For this reason, the distance between the front face of the liquid crystal panel 32 and the back face of the front panel 11 is larger than the distance between the front face of the liquid crystal panel 31 and the back face of the front panel 11. The oval region 451 surrounded by a dashed line represents the border between the liquid crystal panels 31 and 32 including their opposed end regions.

Figure 15:
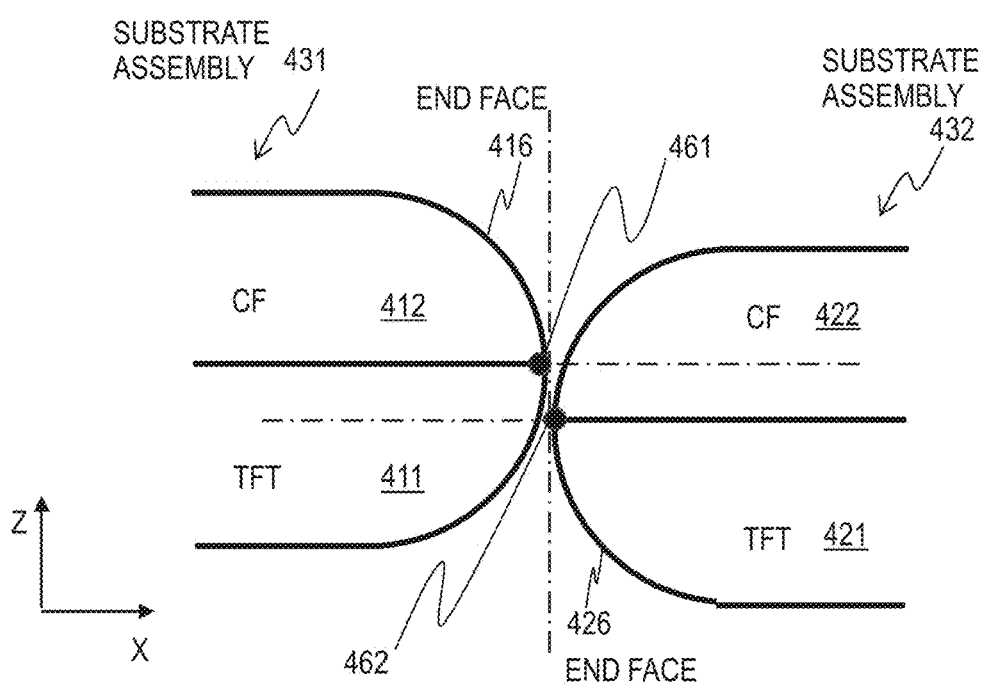
FIG. 15 schematically illustrates the configuration of end regions of substrate assemblies of liquid crystal panels.

FIG. 15 schematically illustrates the configuration of end regions of substrate assemblies 431 and 432 of the liquid crystal panels 31 and 32. As described above, the distance between the front face of the liquid crystal panel 32 and the back face of the front panel 11 is larger than the distance between the front face of the liquid crystal panel 31 and the back face of the front panel 11. Accordingly, the tip 461 of the end face 416 of the substrate assembly 431 and the tip 462 of the end face 426 of the substrate assembly 432 are located at different positions on the Z-axis. Specifically, the distance (along the Z-axis) between the tip 461 of the end face 416 of the substrate assembly 431 and the back face of the front panel 11 is shorter than the distance between the tip 462 of the end face 426 of the substrate assembly 432 and the back face of the front panel 11.

In the configuration example of FIGS. 14 and 15, the end faces 416 and 426 are distant and not in contact with each other in a normal state. However, the tip 461 of the end face 416 and the tip 462 of the end face 426 are located at the same position on the X-axis. Accordingly, the end faces 416 and 426 look as if they are in contact with each other when viewed along the Z-axis. This configuration prevents generation of glass cullet without impairing the display quality. The tip 461 of the end face 416 can be located closer to the end face 426 than the position illustrated in FIG. 15 and the tip 462 of the end face 426 can be located closer to the end face 416 than the position illustrated in FIG. 15. In other words, the tip 461 can be located on the end face 426 and the tip 462 can be located on the end face 416 when viewed along the Z-axis.

Figure 16:
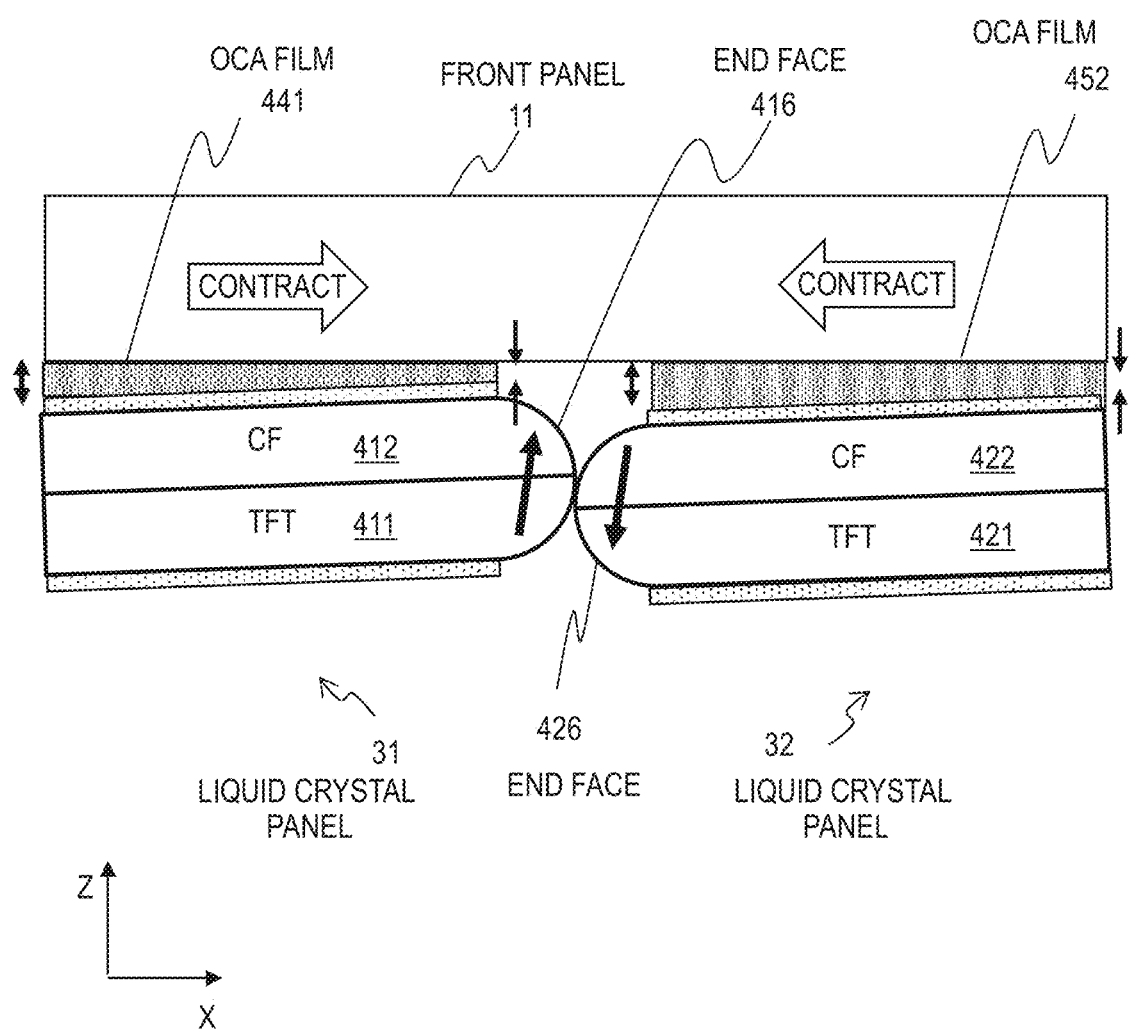
FIG. 16 is a cross-sectional diagram schematically illustrating the movement of the liquid crystal panels when the front panel contracts.

FIG. 16 is a cross-sectional diagram schematically illustrating the movement of the liquid crystal panels 31 and 32 when the front panel 11 contracts. When the front panel 11 contracts, the liquid crystal panels 31 and 32 move along the X-axis to get close to each other. Since the opposed end faces 416 and 426 are curved surfaces, the end faces 416 and 426 in contact with each other can easily slide oppositely. As a result, generation of glass cullet is effectively reduced.

In this example, the end face 416 of the liquid crystal panel 31 slides toward the front panel 11 and the end face 426 of the liquid crystal panel 32 slides away from the front panel 11. In FIG. 16, the liquid crystal panels 31 and 32 rotate to the left together with the movement of the end faces 416 and 426.

The thickness of the OCA film 441 decreases in the region close to the end face 416 and increases in the opposite region. The thickness of the OCA film 452 increases in the region close to the end face 426 and decreases in the opposite region. The OCA films 441 and 452 have a smaller elastic modulus than the front panel 11, the CF substrates 412 and 422, and the TFT substrates 411 and 421 and therefore, they can deform easily. The elastic modulus can be in the aforementioned range. Because of the difference in the position of the tip of the end face between the liquid crystal panels 31 and 32, the rotation of the liquid crystal panels 31 and 32 is restricted to one direction. Specifically, the liquid crystal panel whose tip is far from the front panel 11 rotates in such a manner that the tip gets away from the front panel 11. On the other hand, the liquid crystal panel whose tip is close to the front panel 11 rotates in such a manner that the tip gets close to the front panel 11. This configuration such that the tips of the two liquid crystal panels are located different positions from the front panel 11 enables the movement of the liquid crystal panels to be restricted, which facilitates designing the liquid crystal display device 1. The bonding regions having different thicknesses are also applicable to the configuration examples illustrated in FIGS. 3 to 9.

Figure 17:
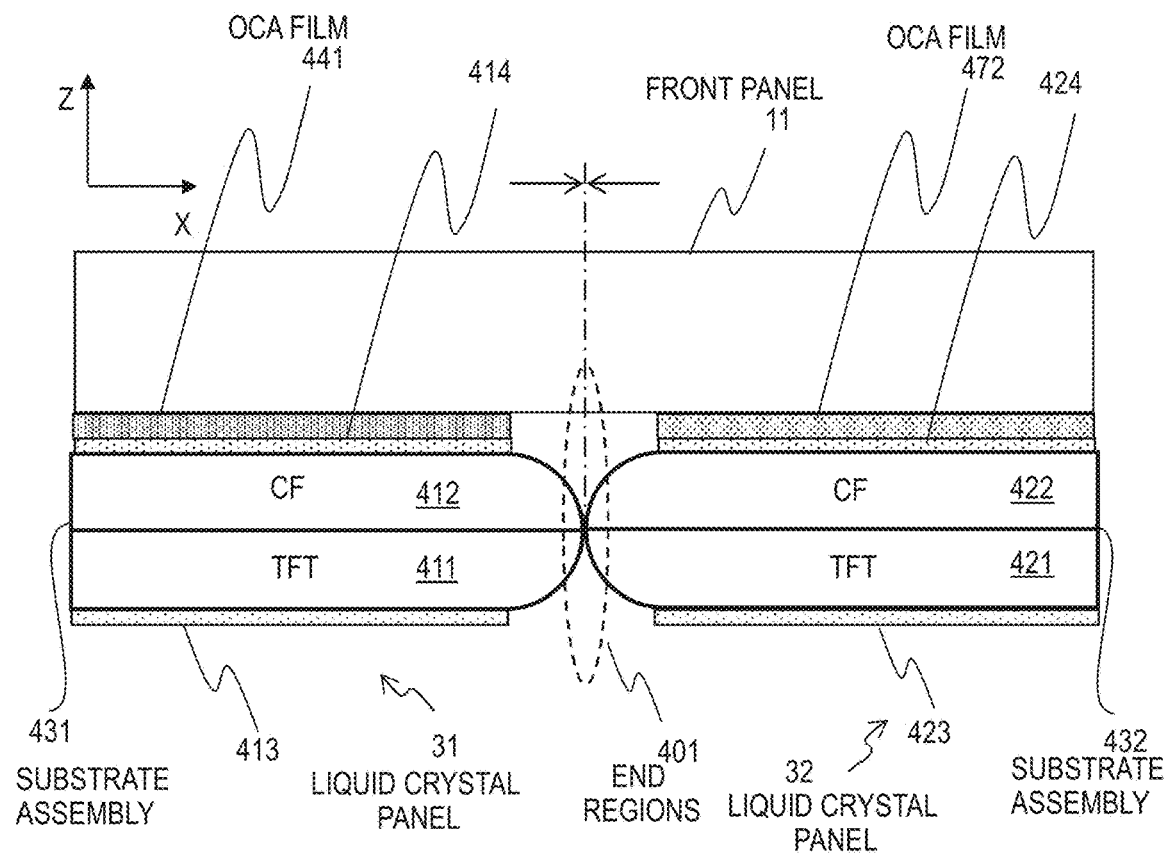
FIG. 17 is a cross-sectional diagram schematically illustrating the configuration of a part of a liquid crystal display device in still another embodiment of this specification.

FIG. 17 is a cross-sectional diagram schematically illustrating the configuration of a part of a liquid crystal display device 1 in still another embodiment of this specification. In the following, differences from the configuration example described with reference to FIGS. 10 to 12 are mainly described. The configuration example in FIG. 17 includes an OCA film 472 in place of the OCA film 442 in the configuration example of FIG. 10. The OCA film 472 has a smaller elastic modulus than the OCA film 441. The remaining is the same as the configuration example described with reference to FIGS. 10 to 12; for example, the OCA films 441 and 472 have an equal thickness.

Figure 18:
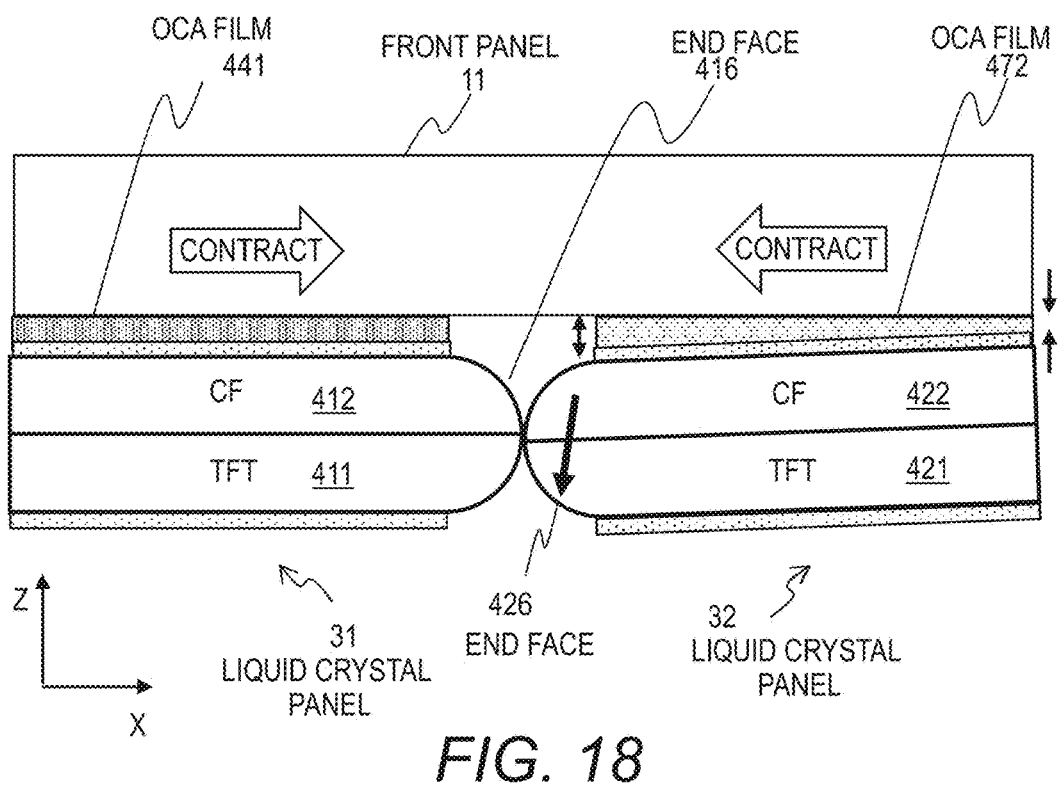
FIG. 18 is a cross-sectional diagram schematically illustrating the movement of the liquid crystal panels when the front panel contracts.

FIG. 18 is a cross-sectional diagram schematically illustrating the movement of the liquid crystal panels 31 and 32 when the front panel 11 contracts. When the front panel 11 contracts, the liquid crystal panels 31 and 32 move along the X-axis to get close to each other. Since the opposed end faces 416 and 426 are curved surfaces, the end faces 416 and 426 in contact with each other can easily slide relatively. As a result, generation of glass cullet is effectively reduced.

In this example, the end face 416 of the liquid crystal panel 31 substantially does not move. The end face 426 of the liquid crystal panel 32 slides away from the front panel 11. In FIG. 18, the liquid crystal panel 32 rotates to the left with the movement of the end face 426. The thickness of the OCA film 472 increases in the region close to the end face 426 and decreases in the opposite region. This is caused by the difference in elastic modulus between the OCA films 441 and 472. The elastic moduli of the OCA films 441 and 472 can be in the aforementioned range. The liquid crystal panel 32 can rotate in the opposite direction.

This configuration such that the OCA films 441 and 472 have different elastic moduli enables the movement of the liquid crystal panels to be restricted, which facilitates designing the liquid crystal display device 1. The bonding regions having different elastic moduli are also applicable to the configuration examples illustrated in FIGS. 3 to 16.

Figure 19:
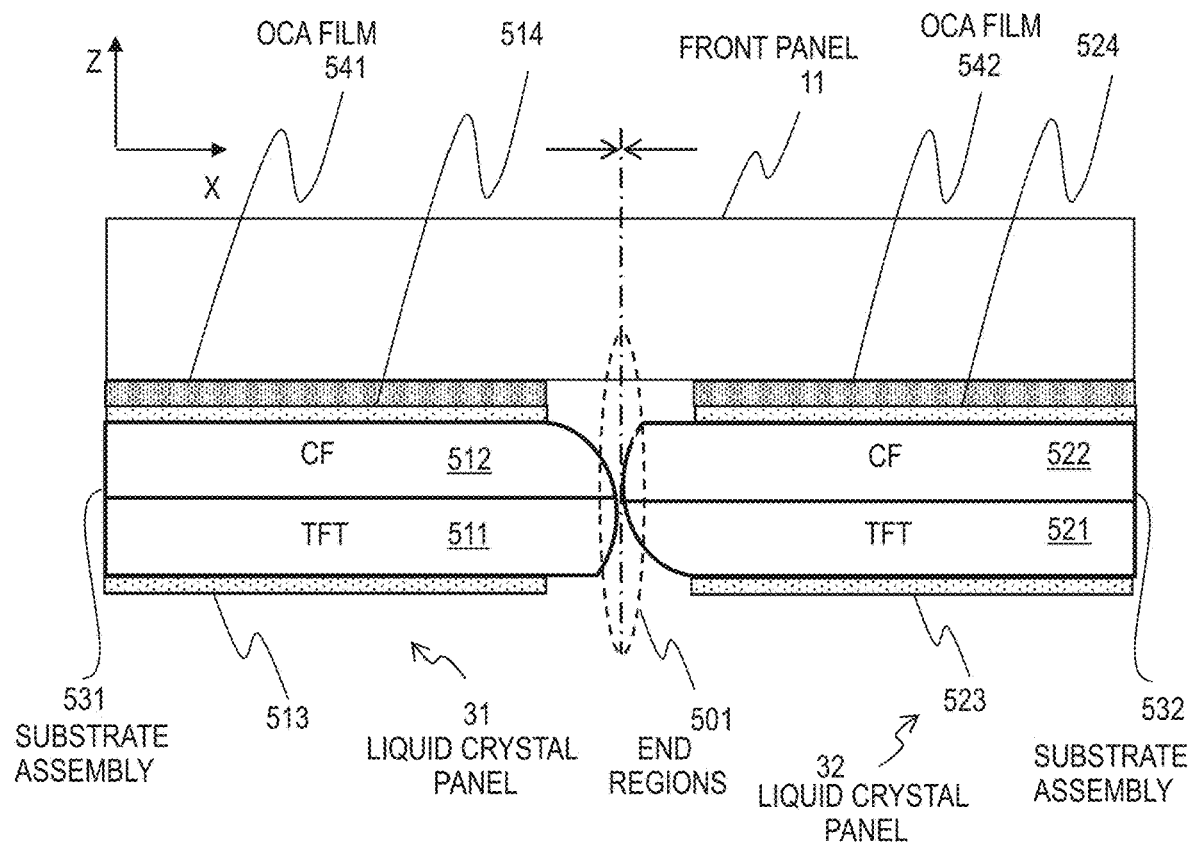
FIG. 19 is a cross-sectional diagram schematically illustrating the configuration of a part of a liquid crystal display device in still another embodiment of this specification.

FIG. 19 is a cross-sectional diagram schematically illustrating the configuration of a part of a liquid crystal display device 1 in still another embodiment of this specification. FIG. 19 illustrates a front panel 11 and liquid crystal panels 31 and 32 disposed adjacent to each other behind the front panel 11. In FIG. 19, the upper side is the front. The liquid crystal panels 31 and 32 are color liquid crystal panels. Various types of liquid crystal panels and configurations thereof are known; any type of liquid crystal panels can be employed.

The liquid crystal panel 31 includes a TFT substrate 511 including a TFT array fabricated on a glass substrate and a CF substrate 512 including a color filter fabricated on a glass substrate. The CF substrate 512 is an opposite substrate opposed to the TFT substrate 511. The opposed faces of the TFT substrate 511 and the CF substrate 512 are bonded with a sealer (not shown) and liquid crystal material (not shown) is enclosed in the space surrounded by the sealer.

Polarizing plates 513 and 514 are provided on the back of the TFT substrate 511 and the front of the CF substrate 512. The back face of the front panel 11 and the front face of the polarizing plate 514 are bonded with an OCA film 541, which is an example of the bonding region 21.

The liquid crystal panel 32 includes a TFT substrate 521 including a TFT array fabricated on a glass substrate and a CF substrate 522 including a color filter fabricated on a glass substrate. The CF substrate 522 is an opposite substrate opposed to the TFT substrate 521. The opposed faces of the TFT substrate 521 and the CF substrate 522 are bonded with a sealer (not shown) and liquid crystal material (not shown) is enclosed in the space surrounded by the sealer.

Polarizing plates 523 and 524 are provided on the back of the TFT substrate 521 and the front of the CF substrate 522. The back face of the front panel 11 and the front face of the polarizing plate 524 are bonded with an OCA film 542, which is an example of the bonding region 22.

Other kinds of display panels different from the liquid crystal panel can be structured to have one glass substrate, instead of the multi-substrate structure. For example, an OLED display panel includes a TFT array and light-emitting elements fabricated on one glass substrate; they can be covered with a resin layer of a structural encapsulation unit.

In the example of FIG. 19, the OCA films 541 and 542 have an equal thickness. Accordingly, the distance between the front face of the liquid crystal panel 31 (the front face of the polarizing plate 514) and the back face of the front panel 11 is equal to the distance between the front face of the liquid crystal panel 32 (the front face of the polarizing plate 524) and the back face of the front panel 11. The OCA films 541 and 542 are made of the same material and their elastic moduli are the same.

The liquid crystal panels 31 and 32 have an equal thickness. More specifically, the polarizing plates 514 and 524 have an equal thickness; the CF substrates 512 and 522 have an equal thickness; the TFT substrates 511 and 521 have an equal thickness; and the polarizing plates 513 and 523 have an equal thickness. The oval region 501 surrounded by a dashed line represents the border between the liquid crystal panels 31 and 32 including their opposed end regions. The end regions of the liquid crystal panels 31 and 32 are opposed in the direction parallel to the main faces and distant from each other.

Figure 20:
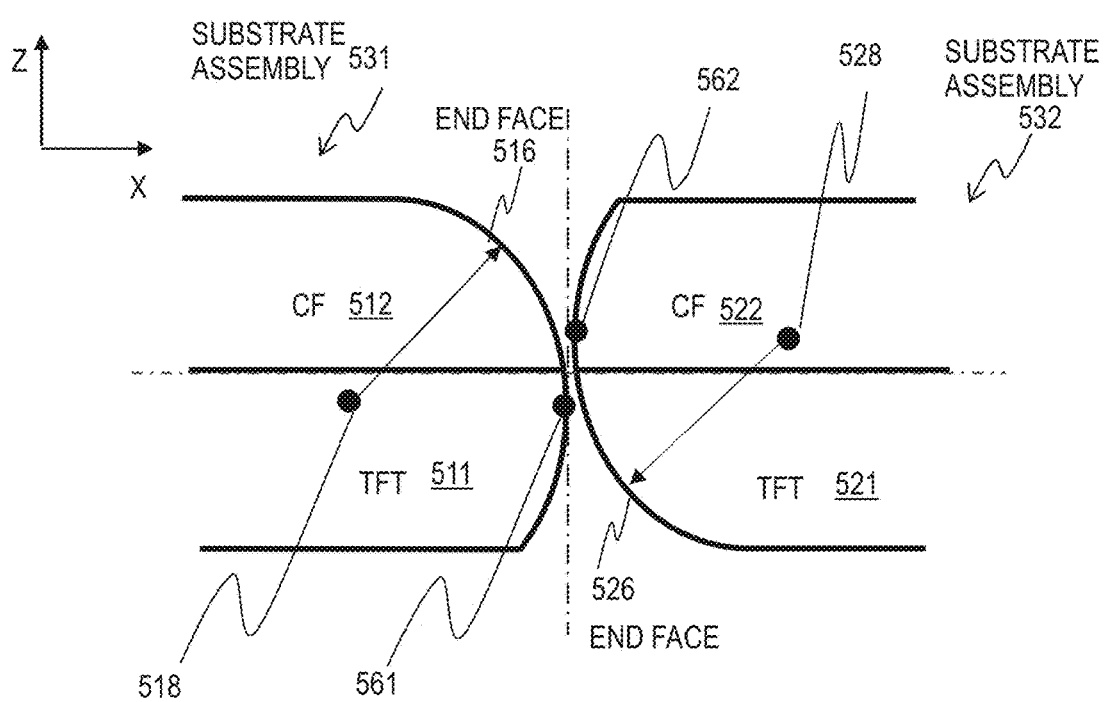
FIG. 20 schematically illustrates the configuration of end regions of substrate assemblies of liquid crystal panels.

FIG. 20 schematically illustrates the configuration of end regions of substrate assemblies 531 and 532 of the liquid crystal panels 31 and 32. The opposed end regions of the substrate assemblies 531 and 532 have identical cross-sections along the Y-axis for a specific length. The substrate assembly 531 consists of the TFT substrate 511 and the CF substrate 512 laid one above the other and the substrate assembly 532 consists of the TFT substrate 521 and the CF substrate 522 laid one above the other. As described above, the substrate assemblies 531 and 532 have an equal thickness.

The substrate assembly 531 has an end face 516 and the substrate assembly 532 has an end face 526. The end face 516 consists of an end face of the TFT substrate 511 and an end face of the CF substrate 512. There is a tiny gap between these end faces. The end face 526 consists of an end face of the TFT substrate 521 and an end face of the CF substrate 522. There is a tiny gap between these end faces.

The end faces 516 and 526 have the same surface roughness Ra as the end faces 216 and 226 described with reference to FIGS. 3 to 5. This configuration effectively reduces the generation of glass cullet caused by a contact or change of the state of contact between the end faces 516 and 526. The end faces 516 and 526 are curved surfaces and they are distant from each other. The end faces 516 and 526 can be in contact with each other in a normal state. In that case, the contact between the end faces 516 and 526 is linear contact.

The end faces 516 and 526 are convex surfaces and opposed to each other. The cross-sections of the end faces 516 and 526 are convex arcs and the tip 561 of the end face 516 and the tip 562 of the end face 526 are located at different positions on the Z-axis. In other words, they are at different distances from the back face of the front panel 11. In the example of FIG. 20, the two tips 561 and 562 are located at the same position on the X-axis. In other words, when viewed along the normal to the back face of the front panel 11, the two tips 561 and 562 coincide. This configuration provides high display quality. The tip 561 or 562 can be located at the same position on the X-axis as another point on the end face 526 or 516. The opposed end faces 516 and 526 can look as if they have zero distance or overlap each other when viewed along the Z-axis.

The center of curvature 518 in the cross-section of the end face 516 and the center of curvature 528 in the cross-section of the end face 526 are located at different distances from the back face of the front panel 11 (different positions on the Z-axis). Specifically, the distance between the center of curvature 518 of the end face 516 and the back face of the front panel 11 is longer than the distance between the center of curvature 528 of the end face 526 and the back face of the front panel 11. In the configuration example described with reference to FIGS. 10 and 11, the opposed end faces 416 and 426 are plane symmetry. In this example, however, the end faces 516 and 526 are not plane symmetry.

In the example of FIG. 19, the back face of the front panel 11 and the front face of the substrate assembly 531 are parallel. The back face of the front panel 11 and the front face of the substrate assembly 532 are parallel. In the example illustrated in FIGS. 19 and 20, the front faces and the back faces of the substrate assemblies 531 and 532 are parallel (the substrate assemblies 531 and 532 have a uniform thickness) and the front face and the back face of the front panel 11 are parallel (the front panel 11 has a uniform thickness). The main faces of the front panel 11 and the substrate assemblies 531 and 532 are flat.

Figure 21:
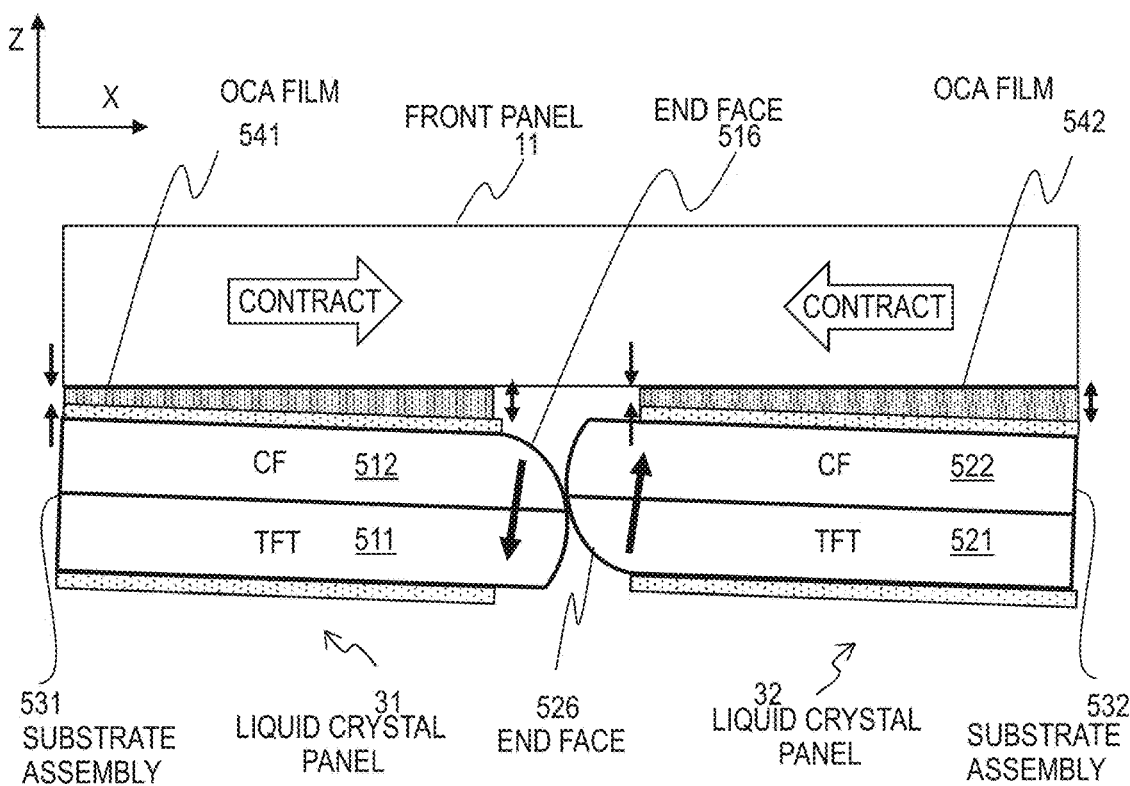
FIG. 21 is a cross-sectional diagram schematically illustrating the movement of the liquid crystal panels when the front panel contracts.

FIG. 21 is a cross-sectional diagram schematically illustrating the movement of the liquid crystal panels 31 and 32 when the front panel 11 contracts. When the front panel 11 contracts, the liquid crystal panels 31 and 32 move along the X-axis to get close to each other. Since the opposed end faces 516 and 526 are curved surfaces, the end faces 516 and 526 in contact with each other can easily slide. As a result, generation of glass cullet is effectively reduced.

The end face 516 of the liquid crystal panel 31 slides in the direction away from the front panel 11 and the end face 526 of the liquid crystal panel 32 slides in the direction toward the front panel 11. The liquid crystal panels 31 and 32 rotate to the right with the movement of the end faces 516 and 526. The direction of the slide is restricted as described above because of the difference in shape between the end faces 516 and 526. Accordingly, designing the liquid crystal display device 1 can be facilitated.

The thickness of the OCA film 541 increases in the region close to the end face 516 and decreases in the opposite region. The thickness of the OCA film 542 decreases in the region close to the end face 526 and increases in the opposite region. The OCA films 541 and 542 have a smaller elastic modulus than the front panel 11, the CF substrates 512 and 522, and the TFT substrates 511 and 521 and therefore, they can deform easily. The elastic modulus can be in the aforementioned range.

When the end faces 516 and 526 are in contact with each other, the contact is linear contact. For this reason, in the case where the liquid crystal panels 31 and 32 move along the Y-axis, generation of glass cullet can also be effectively reduced. Furthermore, in the case where the front panel 11 deforms along the Z-axis, the end faces 516 and 526 of curved surfaces can easily slide; generation of glass cullet can be effectively reduced.

Figure 22:
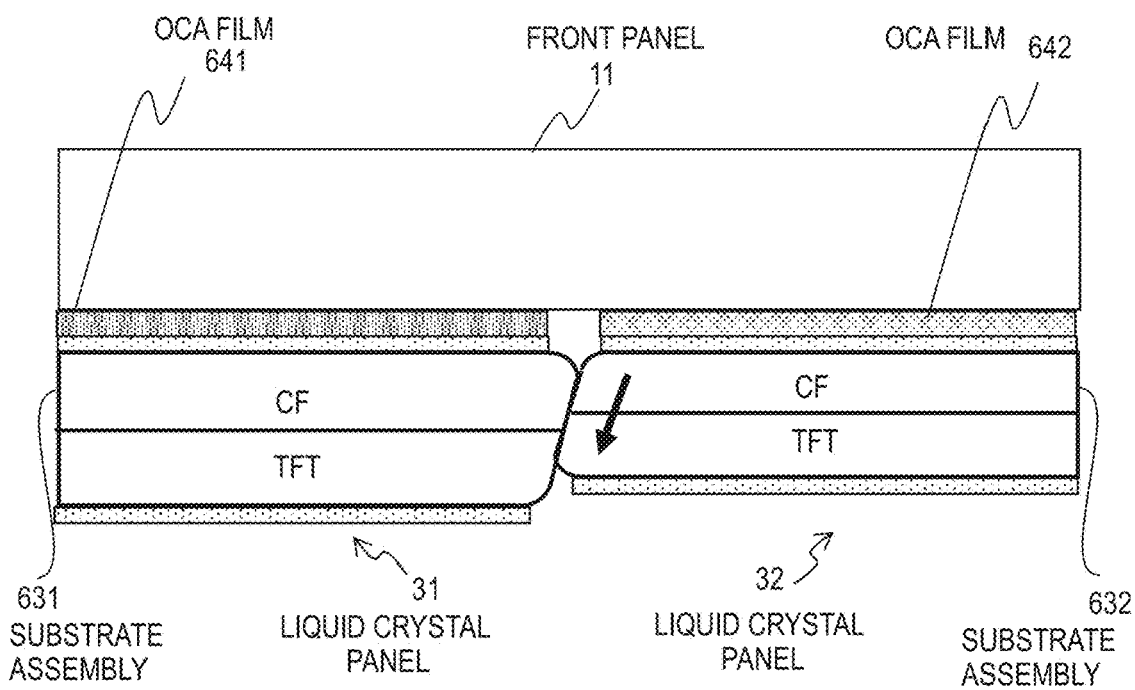
FIG. 22 is a cross-sectional diagram schematically illustrating the configuration of a part of a liquid crystal display device in still another embodiment of this specification.

FIG. 22 is a cross-sectional diagram schematically illustrating the configuration of a part of a liquid crystal display device 1 in still another embodiment of this specification. In the following, differences from the configuration example described with reference to FIGS. 6 to 9 are mainly described. In the configuration example in FIG. 22, an OCA film 641 bonds the liquid crystal panel 31 of a substrate assembly 631 to the back face of the front panel 11 and an OCA film 642 bonds the liquid crystal panel 32 of a substrate assembly 632 to the back face of the front panel 11.

The OCA films 641 and 642 have different elastic moduli. Specifically, the OCA film 642 has a smaller elastic modulus than the OCA film 641. The substrate assembly 631 is thicker than the substrate assembly 632. This configuration determines the liquid crystal panel that mainly moves with deformation of the front panel 11 and accordingly, designing the liquid crystal display device 1 can be facilitated. The two substrate assemblies can have an equal thickness.

Figure 23:
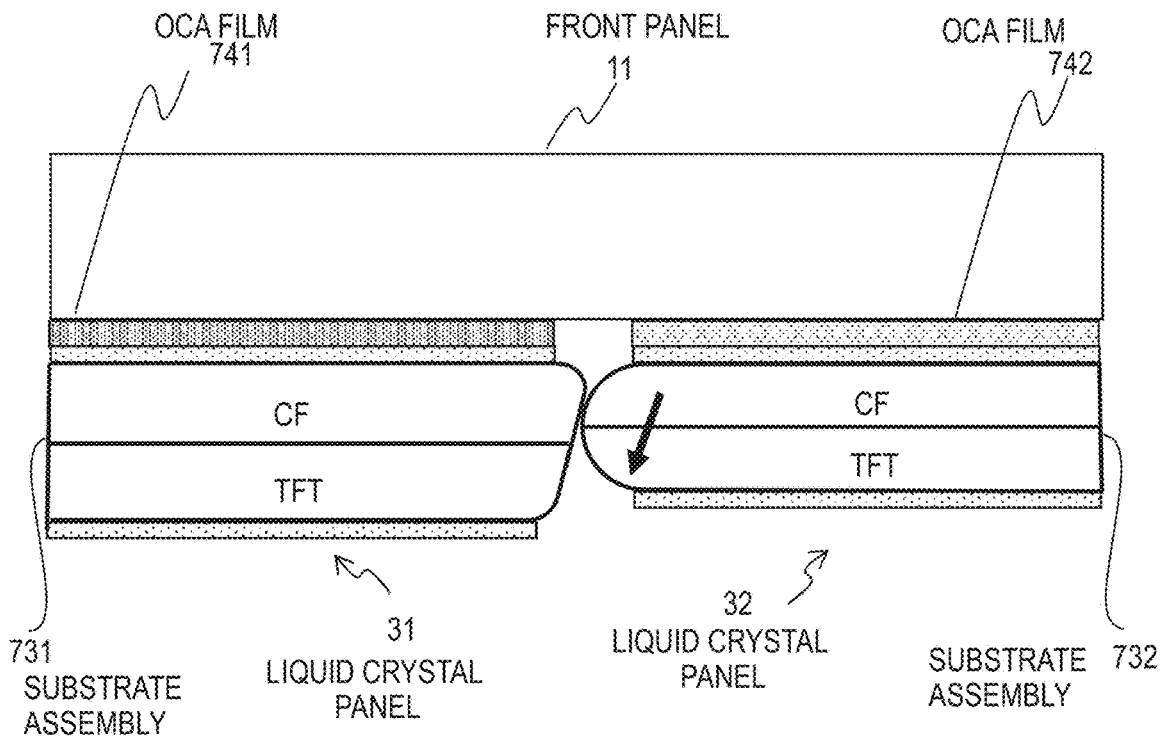
FIG. 23 is a cross-sectional diagram schematically illustrating the configuration of a part of a liquid crystal display device in still another embodiment of this specification.

FIG. 23 is a cross-sectional diagram schematically illustrating the configuration of a part of a liquid crystal display device 1 in still another embodiment of this specification. In the following, differences from the foregoing configuration examples are mainly described. A substrate assembly 731 has the same configuration as the substrate assembly 331 in the configuration example described with reference to FIGS. 6 to 9. A substrate assembly 732 has the same configuration as the substrate assembly 432 in the configuration example described with reference to FIGS. 10 to 13. The substrate assembly 731 is thicker than the substrate assembly 732.

An OCA film 741 bonds the liquid crystal panel 31 of the substrate assembly 731 to the back face of the front panel 11 and an OCA film 742 bonds the liquid crystal panel 32 of the substrate assembly 732 to the back face of the front panel 11. The OCA films 741 and 742 have different elastic moduli. Specifically, the OCA film 742 has a smaller elastic modulus than the OCA film 741. This configuration determines the liquid crystal panel that mainly moves with deformation of the front panel 11 and accordingly, designing the liquid crystal display device 1 can be facilitated. The two substrate assemblies can have an equal thickness.

Figure 24:
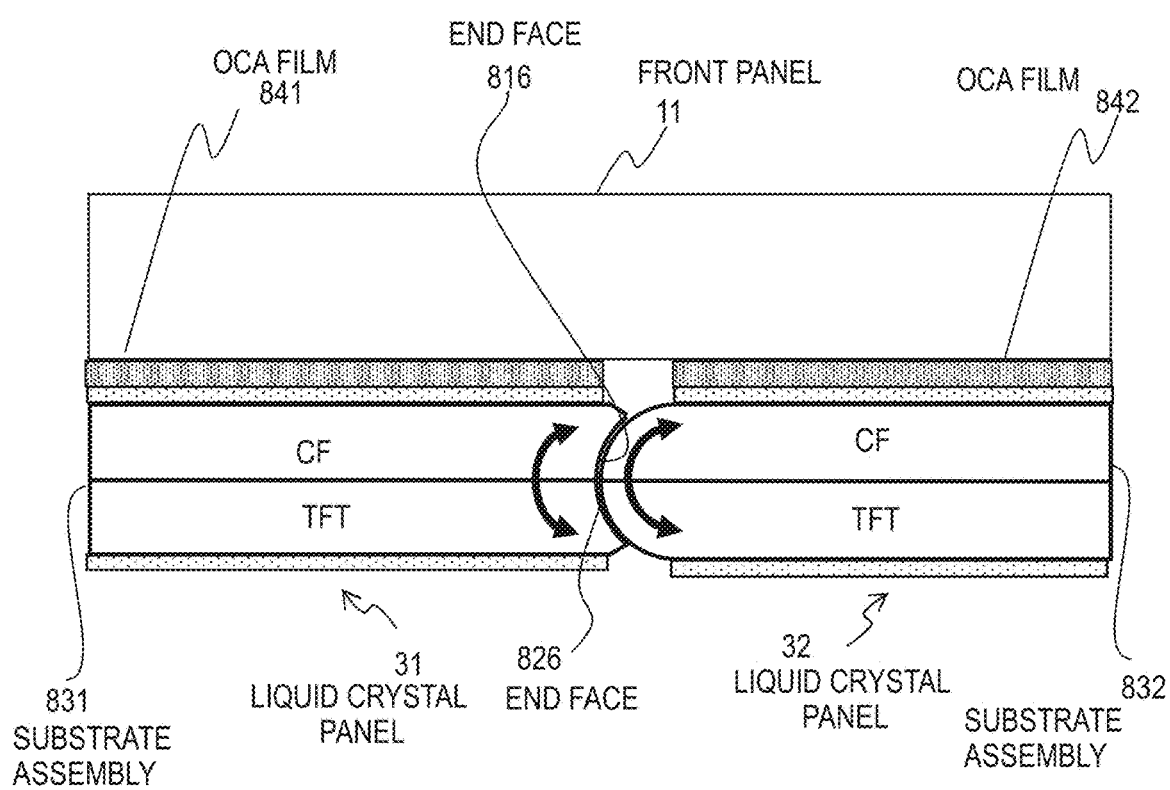
FIG. 24 is a cross-sectional diagram schematically illustrating the configuration of a part of a liquid crystal display device in still another embodiment of this specification.

FIG. 24 is a cross-sectional diagram schematically illustrating the configuration of a part of a liquid crystal display device 1 in still another embodiment of this specification. In the following, differences from the configuration example described with reference to FIGS. 10 to 13 are mainly described. A substrate assembly 832 has the same configuration as the substrate assembly 332 in the configuration example described with reference to FIGS. 10 to 13. An OCA film 841 bonds the liquid crystal panel 31 of a substrate assembly 831 to the back face of the front panel 11 and an OCA film 842 bonds the liquid crystal panel 32 of the substrate assembly 832 to the back face of the front panel 11. The OCA films 841 and 842 have an equal thickness and the same elastic modulus.

The substrate assembly 831 has an end face 816 opposed to an end face 826 of the substrate assembly 832. The end face 826 is a convex surface as described with reference to FIGS. 10 to 13. The end face 816 has a complementary shape to the end face 826; it is a concave surface. The end faces 816 and 826 are distant from or in contact with each other. The end face 816 can have a surface roughness Ra within the aforementioned range. The configuration example of FIG. 24 is effective especially for the deformation along the Z-axis (bending deformation) of the front panel 11.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device comprising:
a support substrate;
a first display panel that is bonded to a first face of the support substrate with a first bonding region; and
a second display panel that is bonded to the first face of the support substrate with a second bonding region,
wherein the first display panel includes a first glass substrate,
wherein the second display panel includes a second glass substrate,
wherein a first end face of the first glass substrate and a second end face of the second glass substrate are opposed to each other without being bonded together,
wherein the first end face is a convex curved surface with a cross-section of a convex arc,
wherein the first end face and the second end face are in linear contact, and
wherein the first end face and the second end face have a surface roughness Ra not higher than 0.5 μm.

2. The display device according to claim 1, wherein the first end face and the second end face has a surface roughness Ra not higher than 0.2 μm.

3. The display device according to claim 1, wherein the second end face is a surface inclined with respect to a normal to the first face.

4. The display device according to claim 3, wherein the second end face is a convex curved surface.

5. The display device according to claim 4, wherein a distance between a tip of the first end face and the first face and a distance between a tip of the second end face and the first face are different.

6. The display device according to claim 5, wherein the first bonding region is thicker than the second bonding region.

7. The display device according to claim 5, wherein the first bonding region and the second bonding region have an equal thickness.

8. A display device comprising:
a support substrate;
a first display panel that is bonded to a first face of the support substrate with a first bonding region; and
a second display panel that is bonded to the first face of the support substrate with a second bonding region,
wherein the first display panel includes a first glass substrate,
wherein the second display panel includes a second glass substrate,
wherein a first end face of the first glass substrate and a second end face of the second glass substrate are opposed to each other,
wherein the first end face and the second end face have a surface roughness Ra not higher than 0.5 μm, and
wherein the first bonding region and the second bonding region have different elastic moduli.

* * * * *